US012627535B2

(12) United States Patent
Lee et al.

(10) Patent No.: US 12,627,535 B2
(45) Date of Patent: May 12, 2026

(54) LINK EQUALIZATION TRAINING METHOD FOR MOBILE DEVICE

(71) Applicant: MEDIATEK Inc., Hsinchu City (TW)

(72) Inventors: Kuan-Chou Lee, Hsinchu City (TW);
Min-Chau Jan, Hsinchu City (TW);
Ko-Yin Lai, Hsinchu City (TW);
Chih-Kang Hsu, Hsinchu City (TW);
Chang-Chen Chu, Hsinchu City (TW);
Ting-Wei Lai, Hsinchu City (TW);
Jyun-Hao Huang, Hsinchu City (TW);
Hsuan-Jung Hsu, Hsinchu City (TW);
Yung-Chih Lin, Hsinchu City (TW);
Mau-Lin Wu, Hsinchu City (TW);
Tai-Lai Tung, Hsinchu City (TW);
Wei-Cheng Tang, Hsinchu City (TW);
Li-Hung Chiueh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 8 days.

(21) Appl. No.: 18/746,312

(22) Filed: Jun. 18, 2024

(65) Prior Publication Data

US 2025/0267045 A1     Aug. 21, 2025

Related U.S. Application Data

(60) Provisional application No. 63/555,919, filed on Feb. 21, 2024.

(51) Int. Cl.
*H04L 25/03* (2006.01)

(52) U.S. Cl.
CPC ............................ *H04L 25/03006* (2013.01)

(58) Field of Classification Search
CPC ................................................. H04L 25/03006
See application file for complete search history.

(56) References Cited

U.S. PATENT DOCUMENTS

| | | | | |
|---|---|---|---|---|
| 10,498,561 | B2 * | 12/2019 | Johnson | ............ H04L 25/03114 |
| 2024/0111700 | A1 * | 4/2024 | Srivastava | .......... G06F 13/4221 |

FOREIGN PATENT DOCUMENTS

| | | | | | |
|---|---|---|---|---|---|
| EP | 1352490 | B1 * | 2/2005 | ......... | H04L 27/2655 |
| WO | WO-2011067136 | A1 * | 6/2011 | ........... | G06F 13/385 |

OTHER PUBLICATIONS

Machine translation of WO-2024109015-A1 (Year: 2024).*

* cited by examiner

*Primary Examiner* — Jean B Corrielus

(74) *Attorney, Agent, or Firm* — McClure, Qualey & Rodack, LLP

(57) ABSTRACT

The disclosure provides a link equalization training method for a mobile device, comprising: setting to start-up link; performing a first power mode change to change a link rate to a first data rate; performing link equalization training on a receiver of a second node in response to a plurality of training sequences from a first node; when link equalization training in the receiver of the second node is not completed and there is no any error event, making a decision mechanism to perform link equalization training in the receiver of the second node; when link equalization training in the receiver of the second node is not completed and there is any error event, making the decision mechanism to reset for start-up link; and when link equalization training in the receiver of the second node is completed, setting link-up in the first data rate for data transfer.

17 Claims, 24 Drawing Sheets

After both TX and RX enter burst state

TX behavior :

1170
Link startup flow

1171
PACP_PWR_req and
PACP_PWR_cnf
handshaking

1172
Configure MODULEs

1173
Link training flow: Phase0

1174
Link training flow: Phase1

1175
Link training flow: Phase2

1176
If it is the first LT timeout
•SW change the initial TX EQ
•DME RESET and retry link training

1030

From LT_IRQ Decision Flow

1310
Reset SW_IRQRetryCnt

1315
LTDM_PeerOptTxEqLx=
RX_Opt_TXEQ_Lx

1320
Current
performance > previous
performance?

Yes

1325
Writing current TX EQ
LTDM_LocalOptTxEqLx

No

1330
Set local RX_Opt_TXEQ_Lx=
LTDM_LocalOptTxEqLx

1335
To Training Mode decision
flow

LINK EQUALIZATION TRAINING METHOD FOR MOBILE DEVICE

CROSS-REFERENCE TO RELATED ART

This application claims the benefit of U.S. provisional application Ser. No. 63/555,919, filed 2024 Feb. 21, the disclosure of which is incorporated by reference herein in its entirety.

TECHNICAL FIELD

The disclosure relates in general to a link equalization training method for a mobile device.

BACKGROUND

Mobile devices have become indispensable tools in people's lives, providing convenience, connectivity, and access to a wide range of services and information. Mobile devices have become essential in people's lives for several reasons. (1) Communication: Mobile devices enable instant communication through calls, texts, emails, and social media apps, keeping people connected with friends, family, and colleagues regardless of location. (2) Information Access: With mobile devices, people have access to vast amounts of information at their fingertips. They can browse the internet, access news, research topics of interest, and find answers to questions quickly and conveniently. (3) Productivity: Mobile devices allow people to stay productive on the go. They can manage tasks, appointments, and emails, as well as access documents and files through various productivity apps and cloud services. (4) Entertainment: Mobile devices serve as entertainment hubs, providing access to music, videos, games, e-books, and streaming services. They offer a wide range of entertainment options to help people relax and unwind. (5) Navigation: Mobile devices with GPS capabilities provide navigation assistance, helping people find directions, locate businesses, and explore new places without getting lost. (6) Social Connection: Mobile devices facilitate social interactions through social media platforms, messaging apps, and video calls, allowing people to connect with others, share experiences, and maintain relationships.

Mobile Industry Processor Interface (MIPI) specifications are widely used across the Mobile and IoT industries, mainly for applications like cameras, sensors, modems, storage, audio, displays and other peripherals. In the last few years, the automotive industry has also started to adopt many of these protocols. Growing adoptability of these protocols to these different markets is driving quicker enhancements to these MIPI specifications.

MIPI UniPro (Unified Protocol) is one such protocol which is seeing growing adoptability. UniPro is a high-speed interface. UniPro is aimed at providing high-speed data transmission (Gigabits) with minimal interface pins and low power consumption.

The purpose of UniPro development is to support various Applications, Interfaces, Devices, Bandwidth by using a universal protocol. UniPro exhibits excellent scalability, with a maximum support of 128 devices. The UniPro protocol stack encompasses layers L1 to L4 of the Open System Interconnection Reference Model (OSI). Additionally, a PHY adapter layer (PA layer) (L1.5) is introduced between layers M-PHY layer (L1) and Data link layer (L2) to connect to PHY Interface.

In the context of use with UniPro, M-PHY (Physical Layer; L1) is used in a dual-simplex, high bandwidth serial link that employs a low-swing, differential signaling technique for high-speed communication. Unidirectional PHY Links are not supported because various higher protocol layers require return information, e.g., for flow control.

The PHY Adapter Layer (Physical Adapter Layer, PA Layer; L1.5) is responsible for abstracting the details of the PHY technology, thus providing a PHY-independent interface to higher protocol layers. PHY Adapter Layer supports multi-lane, controls power modes for M-PHY, and provides symbol encoding, and automatic capability discovery for M-PHY. The main responsibilities of the Data Link Layer (DL Layer; L2) are to provide reliable links between a transmitter and a directly attached receiver and to multiplex and arbitrate multiple types of data traffic, e.g., priorities. Data Link Layer assembles data and control frames from higher layers, provides retransmission on errors, controls the priorities and support flow control. Network Layers (L3) has a purpose to allow data to be routed to the proper destination in a networked environment. Transport Layer (L4) is the highest UniPro protocol layer involved in the transportation of data; and thus provides the data service interface that is used by hardware or software using UniPro. Unlike lower protocol layers, the Transport Layer tends to concentrate on relatively abstract mechanisms. These mechanisms allow a single physical Packet stream between two Devices to support multiple, independent, logical Packet streams or "Connections". Device Management Entity (DME) controls the layers in the UniPro stack; and provides access to various control parameters in all layers, manages the power mode transitions of the Link, and handles boot-up, hibernate and reset of the entire UniPro stack.

M-PHY is a high speed data communications physical layer protocol standard targeted at the needs of mobile multimedia devices. To support high speed, M-PHY is generally transmitted using differential signaling over impedance controlled traces between components. When use on a single circuit card, the use of electrical termination may be optional. Options to extend its range could include operation over a short flexible flat cable, and M-PHY was designed to support optical media converters allowing extended distance between transmitters and receivers, and reducing concerns with electromagnetic interference.

Also, M-PHY is a versatile physical layer targeting applications with a particular need for high data rates, low pin counts, lane scalability and power efficiency. M-PHY is the base physical layer of JEDEC UFS 2.0, 3.0 and new 4.0. M-PHY is poised to be dominant Mobile Storage interface deployed in 5G-enabled Smartphones. M-PHY is created to meet the constant demand for efficient high-speed communications in mobile ecosystem. M-PHY is used in Flash memory storage and chip-to-chip communication applications for mobile/mobile influenced and automotive ecosystems.

FIG. 1 shows a simplified model of a single UniPro link connecting two device. Link training primarily involves exchanging link equalization training information through UniPro state and PHY adapter layer (L1.5) control, and conducting RX equalizer training in the M-PHY (L1). In the current UniPro 2.0 & M-PHY 5.0 standards, there is no defined link equalizer training process for HS-G1 (high-speed gear 1) to HS-G5 (high-speed gear 5).

Also, there are three main techniques that are used to compensate for inter-symbol interference (ISI) at data rates above 5 Gbps. The three main techniques are CTLE (Continuous-Time Linear Equalizer), FFE (Feed-Forward Equalizer) and DFE (Decision Feedback Equalizer). Each of the three main techniques offers advantages and disadvantages, but, when combined, offer power compensation for channel degradation.

Thus, there is a need to define the link equalization training process for rates above HS-G6 (high-speed gear 6). Further, for UniPro 3.0 and M-PHY 6.0, the application outlines the process for conducting link equalization (equalization) training.

SUMMARY

The disclosure is directed to a link equalization training method for a mobile device, comprising: setting to start-up link; performing a first power mode change to change a link rate to a first data rate; performing link equalization training on a receiver of a second node in response to a plurality of training sequences from a first node; when link equalization training in the receiver of the second node is not completed and there is no any error event, making a decision mechanism to perform link equalization training in the receiver of the second node; when link equalization training in the receiver of the second node is not completed and there is any error event, making the decision mechanism to reset for start-up link; and when link equalization training in the receiver of the second node is completed, setting link-up in the first data rate for data transfer.

Figure 1:
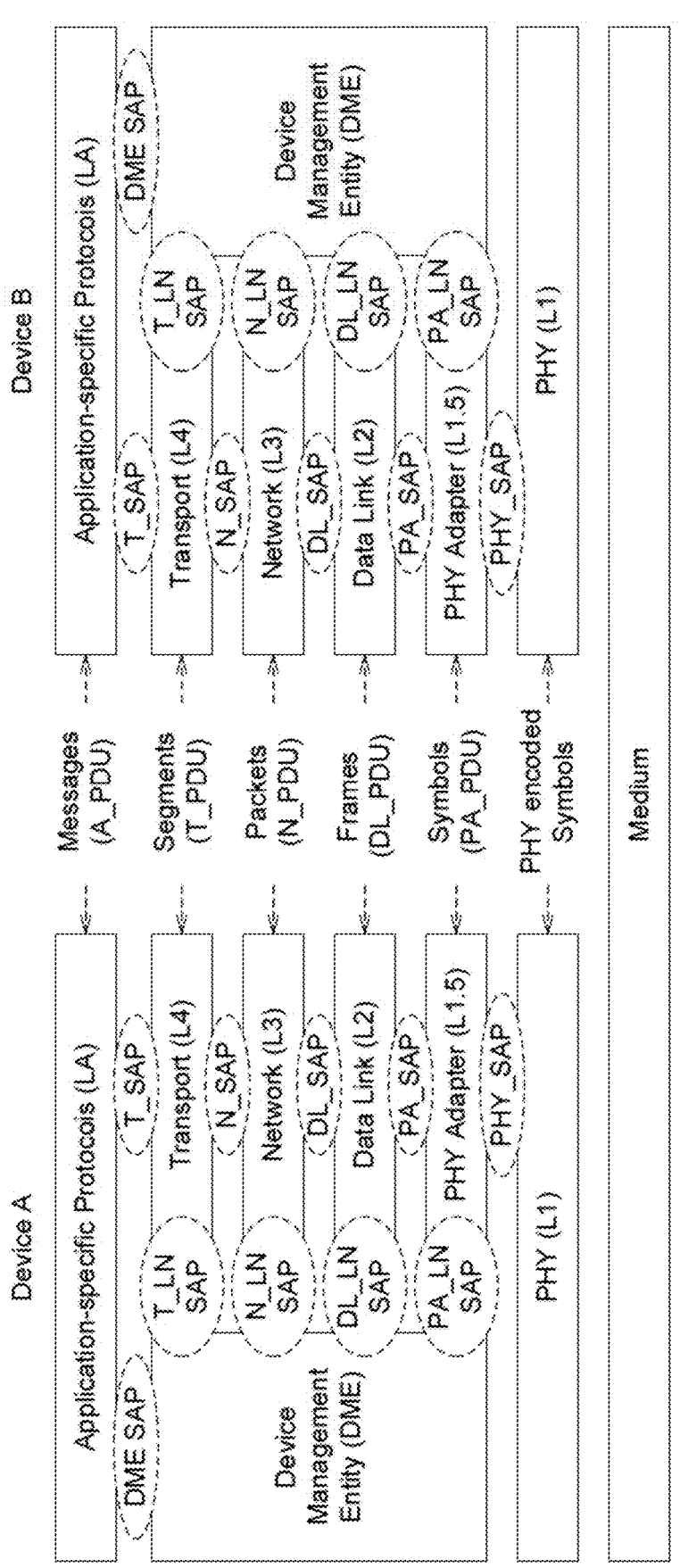
FIG. 1 shows a simplified model of a single UniPro link connecting two devices.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
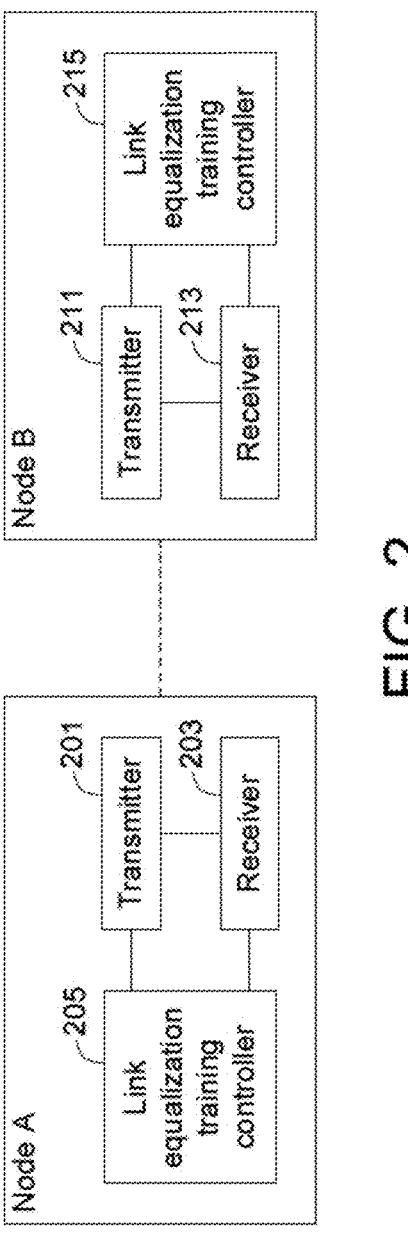
FIG. 2 shows a simplified block diagram of two nodes A and B.

FIG. 2 shows a simplified block diagram of two nodes A and B. In here, a node is for example but not limited by, smart mobile device or the like. Node A includes a transmitter 201, a receiver 203 and a link equalization training controller 205. Similarly, node B includes a transmitter 211, a receiver 213 and a link equalization training controller 215. The link equalization training controllers 205 and 215 are used to control link equalization training. The link equalization training controllers 205 and 215 could be, for example, implemented by a chip, a circuit block in the chip, a firmware circuit, a circuit board having several electronic elements and wires, or a storage medium storing a number of program codes, and could also be implemented by performing a corresponding software or program.

Figure 3:
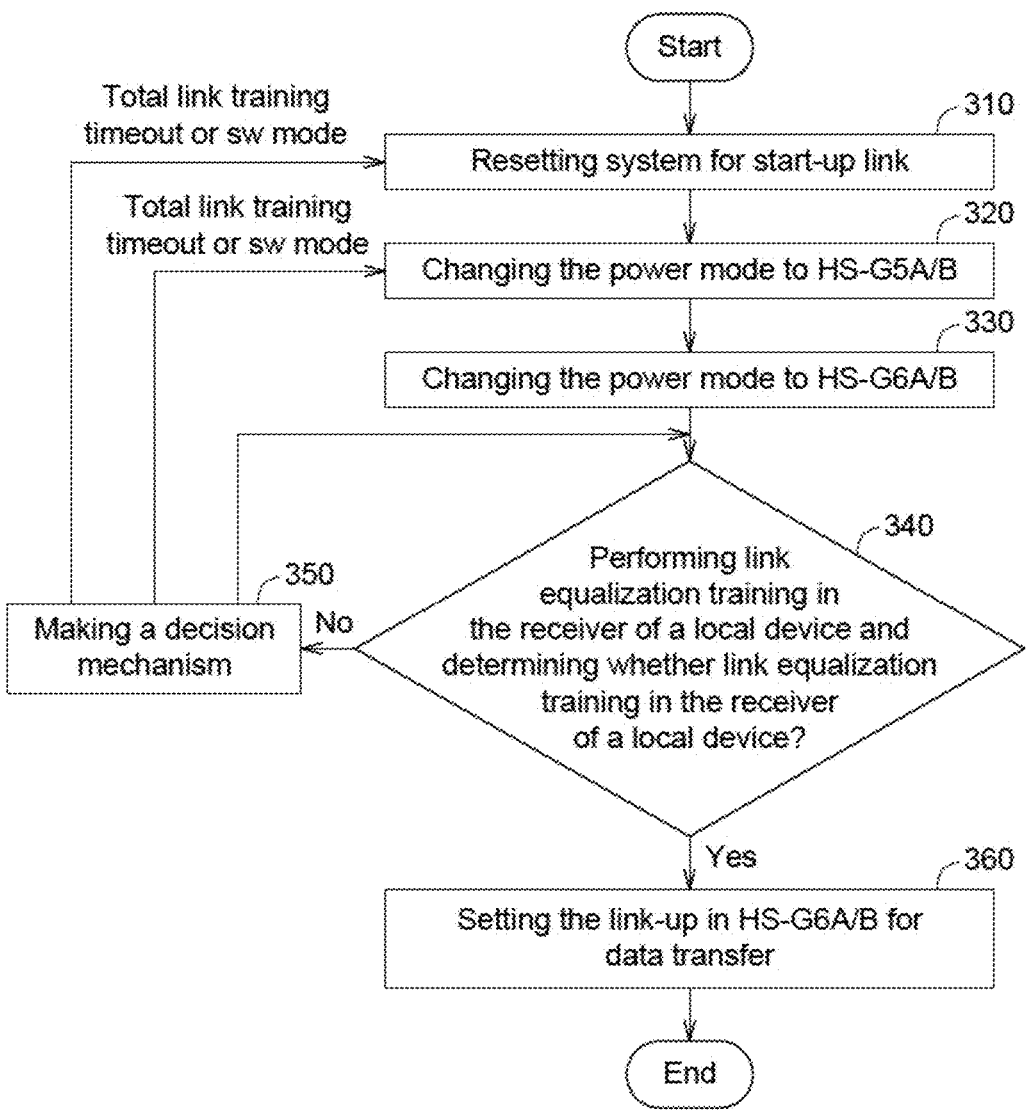
FIG. 3 shows a link equalization training method according to one embodiment of the application.

FIG. 3 shows a link equalization training method according to one embodiment of the application. The link equalization training method according to one embodiment of the application is for example but not limited by, used in UniPro 3.0 and M-PHY 6.0. The link equalization training method according to one embodiment of the application may be also used in other communication protocol or higher data-rate standards, which is still within the spirit and scope of the application.

In step 310, the system is reset to start-up link. For example but not limited by, in step 310, the system is reset to start-up link by setting HS-LSS (high speed Link Startup sequence) mode in HS-G1A (high-speed gear 1A) and to exchange capability. In step 310, the system is changed, for example but not limited by, from off state, disabled state, linkdown state to linkup state.

In step 320, the power mode is changed. For example but not limited by, in step 320, the power mode is changed by changing the link rate to HS-G5A/B (high speed gear 5 A/B). In one embodiment of the application, step 320 is optional. In other words, from step 310 to step 320, the link rate is increased from HS-G1A to HS-G5A/B. In step 320, the link state is changed as: linkup state, linkCfg state then to linkup state.

In step 330, the power mode is changed to change the link rate to HS-G6A/B (high speed gear 6 A/B). In other words, when step 320 is skipped, from step 310 to step 330, the link rate is increased from HS-G1A to HS-G6A/B. Alternatively, when step 320 is included in the link equalization training method, from step 320 to step 330, the link rate is increased from HS-G5A/B to HS-G6A/B.

In step 340, link equalization training in the receiver of a local device is performed and whether link equalization training in the receiver of a local device is completed or not is determined. Step 340 is performed without scrambling. When link equalization training in the receiver is not completed yet, the flow proceeds to step 350. When link equalization training in the receiver is completed, the flow proceeds to step 360. In the following, when the node A is as a local device, the node B is as a peer device; and vice versa.

In step 350, a decision mechanism is made to decide to return to the step 340, to the step 310, or to the step 320. In details, when link equalization training in the receiver is not completed and there is no error event, the decision mechanism is made to return the flow to the step 340. When link equalization training in the receiver is not completed but there is any error event, the decision mechanism is made to return the flow to the step 310 or step 320. In one embodiment of the application, the error event is for example but not limited by, cyclic redundancy check (CRC) event which indicating CRC error is severe.

In step 360, the link-up is set in HS-G6A/B for data transfer.

Figure 4:
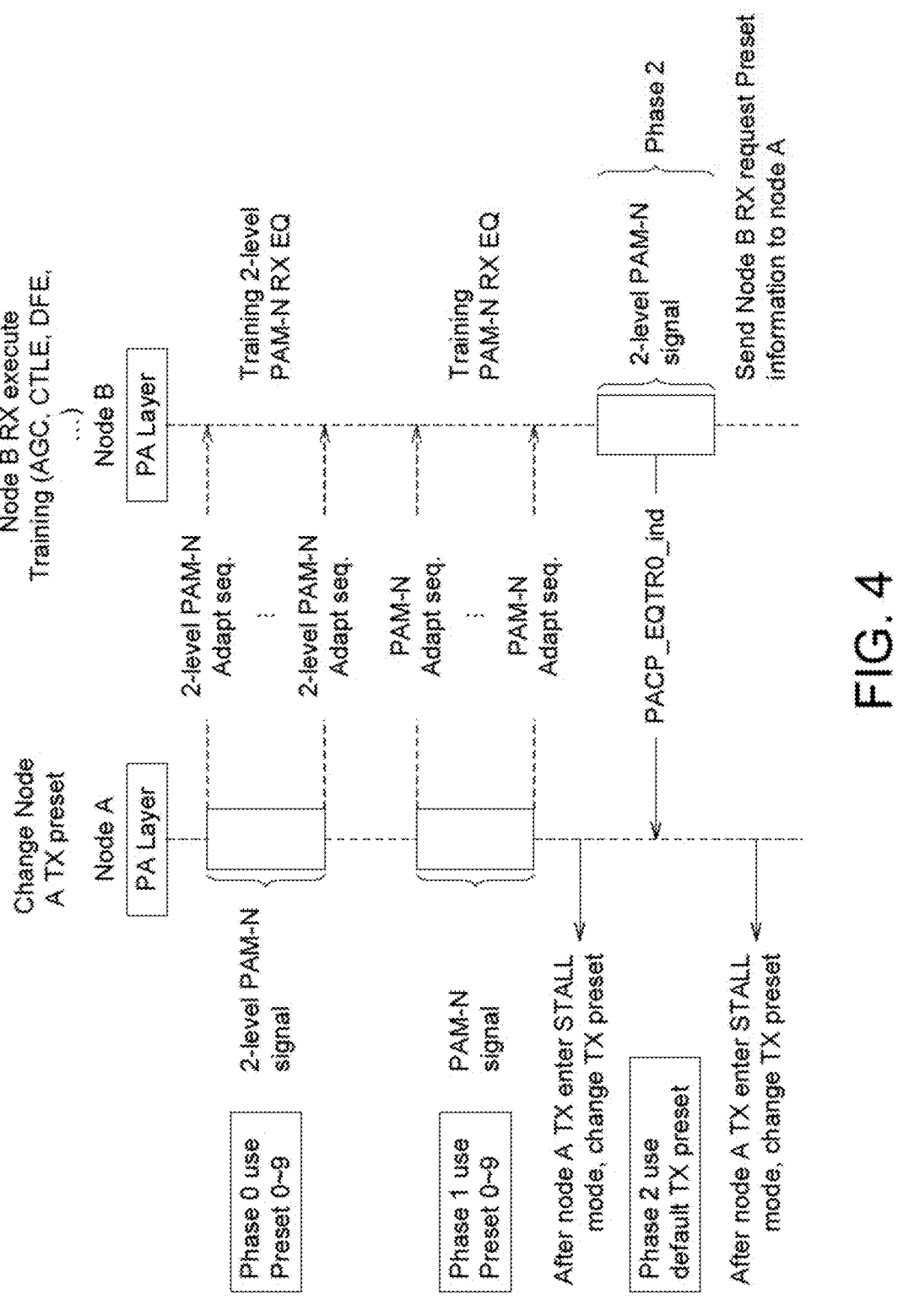
FIG. 4 shows a process of link equalization training flow according to one embodiment of the application.

FIG. 4 shows a process of link equalization training flow according to one embodiment of the application. FIG. 4 shows that the node A changes preset FFE setting of the transmitter of the node A in response to the request from node B; and that the node B executes the link equalization training (ACG, CTLE, DFE) (i.e. to train receiver of the node B) based on the training sequences sent from the node A. From FIG. 4, one skilled art in the person would understand how to change preset FFE setting of the transmitter of the node B and to train the receiver of the node A. FIG. 4 is performed by PHY adapter layer (PA layer) (L1.5). Link equalization training flow includes a first phase (Phase 0), a second phase (Phase 1) and a third phase (Phase 2).

In the first phase (phase 0), the node A transmits first training sequences to the node B by using the preset FFE gear setting of the transmitter of the node A. The preset FFE gear setting of the transmitter of the node A may be selected among all FFE gear setting of the transmitter of the node A. For example but not limited by, the transmitter of the node A has ten FFE gear setting. In one embodiment of the application, in order to reduce bit error (BR) rate, in phase 0, the first training sequences may be for example but not limited by, 2-level Pulse-amplitude modulation (PAM)-N signals. As known, the PAM-4 signals have four levels, i.e. level 0-level 3. In the phase 0, level 0 and level 3 PAM signals are used as the first training sequences. After the node B receives the training sequences (2-level PAM-N signals), the receiver of the node B trains the link equalization.

In the second phase (phase 1), the node A transmits second training sequences to the node B by using the preset FFE gear setting of the transmitter of the node A. In the phase 1, level 0-level 3 (i.e. all-level) PAM-4 signals are used as the second training sequences. After the node B receives the training sequences (4-level PAM-4 signals), the receiver of the node B trains the link equalization.

Between phase 1 and phase 2 (the third phase), the transmitter of the node A enters into STALL mode to change the preset FFE gear setting of the transmitter of the node A.

In the third phase (phase 2), the transmitter of the node B sends receiver request preset information in the information exchange frame (for example, PACP_EQTR0_ind) to the node A. The information exchange frame (for example, PACP_EQTR0_ind) will be described in details in the following. The receiver request preset information is used to inform the node A about the optimized FFE gear setting selected by the receiver of the node B after link equalization training. The information exchange frame in phase 2 is also 2-level PAM-N signals.

After phase 2, the transmitter of the node A changes the preset FFE gear setting based on the optimized FFE gear setting selected by the receiver of the node B when the transmitter of the node A enters into the STALL mode.

Figure 5:
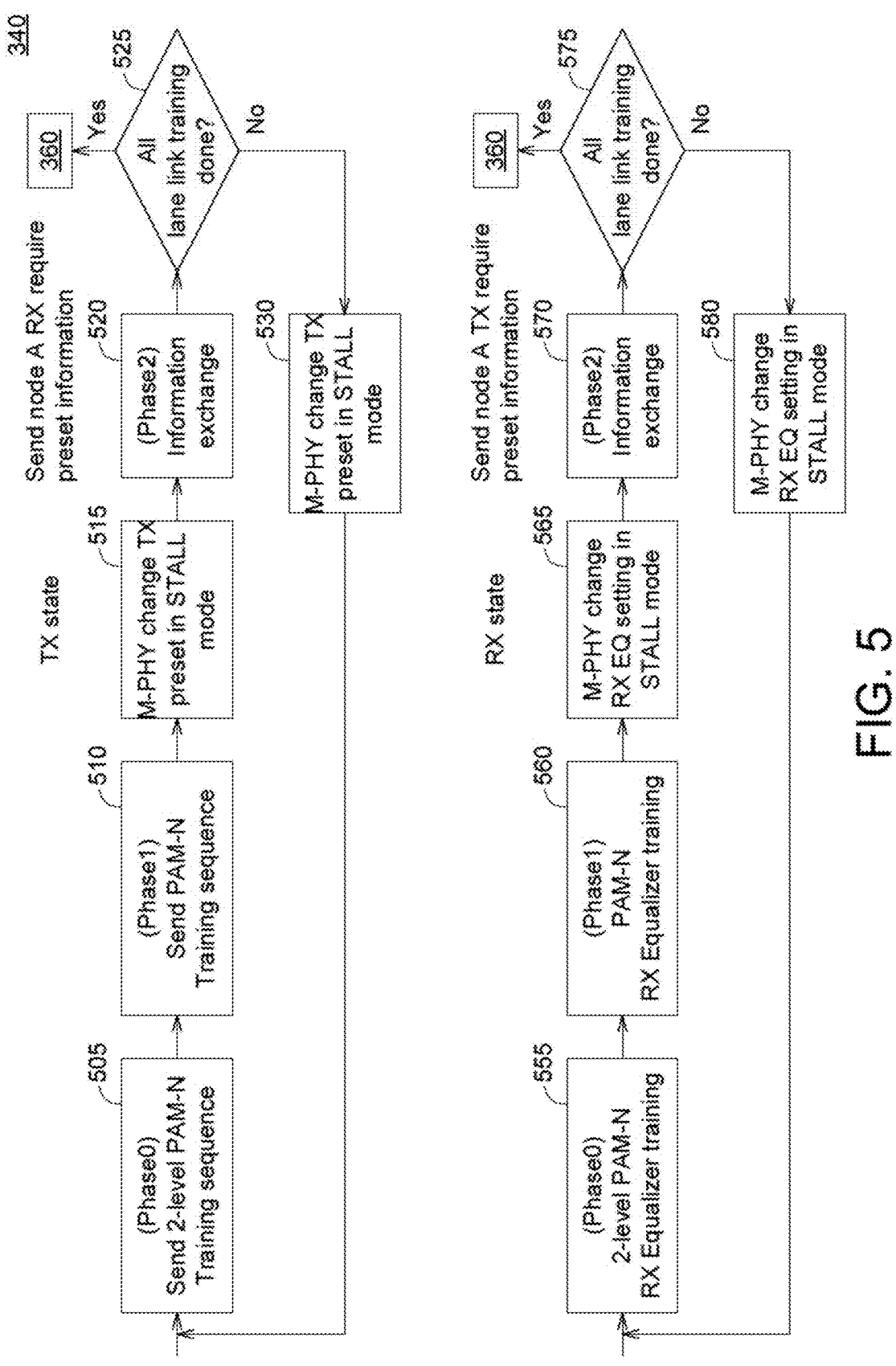
FIG. 5 shows the process of link equalization training flow according to one embodiment of the application.

FIG. 5 shows the process of link equalization training flow according to one embodiment of the application. FIG. 5 shows the process of the transmitter and the receiver of the node A in link equalization training flow, which can be used in the process of the transmitter and the receiver of the node B in link equalization training flow.

In step 505, in the first phase (phase 0), the transmitter of the node A sends the training sequences (in 2-level PAM-N signals) to the receiver of the node B to train the link equalization of the receiver of the node B.

In step 510, in the second phase (phase 1), the transmitter of the node A sends the training sequences (in 4-level PAM-N signals) to the receiver of the node B to train the link equalization of the receiver of the node B.

In one embodiment of the application, in steps 505 and 510, in the first round of the link equalization training, the default preset FFE gear setting is used; in the second or later rounds of the link equalization training, the preset FFE gear setting is changed by the receiver of the node B.

In step 515, the transmitter of the node A changes the preset FFE gear setting of the transmitter of the node A in the STALL mode.

In step 520, in the third phase (phase 2), the node A and the node B exchange information about optimized FFE gear setting selected by the receiver of the node B after link equalization training. In the phase 2, the default preset FFE gear setting is set by the PA layer in the phase 1 through additional RMII (Reduced Media Independent Interface). In the phase 2, in the first or later rounds of the link equalization training, the default preset FFE gear setting is always used; and the preset FFE gear setting in the phase 0 and the phase 1 of the next round is set by the PA layer in the phase 2.

In step 525, whether link equalization training for all active lanes is done is determined. When step 525 is yes, the flow proceeds to the step 360 of FIG. 3. When step 525 is no, the flow proceeds to the step 530.

In step 530, the transmitter of the node A changes the preset FFE gear setting based on the optimized FFE gear setting selected by the receiver of the node B in the STALL mode.

In step 555, in the first phase (phase 0), the receiver of the node B receives the training sequences (in 2-level PAM-N signals) from the transmitter of the node A to train the link equalization of the receiver of the node B.

In step 560, in the second phase (phase 1), the receiver of the node B receives the training sequences (in 4-level PAM-N signals) from the transmitter of the node A to train the link equalization of the receiver of the node B.

In step 565, the receiver of the node B changes the equalization setting in the STALL mode.

In step 570, in the third phase (phase 2), the node A and the node B exchange information about optimized FFE gear setting selected by the receiver of the node B after link equalization training.

In step 575, whether link equalization training for all active lanes is done is determined. When step 575 is yes, the flow proceeds to the step 360 of FIG. 3. When step 575 is no, the flow proceeds to the step 580.

In step 580, the receiver of the node B changes the equalization setting in the STALL mode.

Figure 6A:
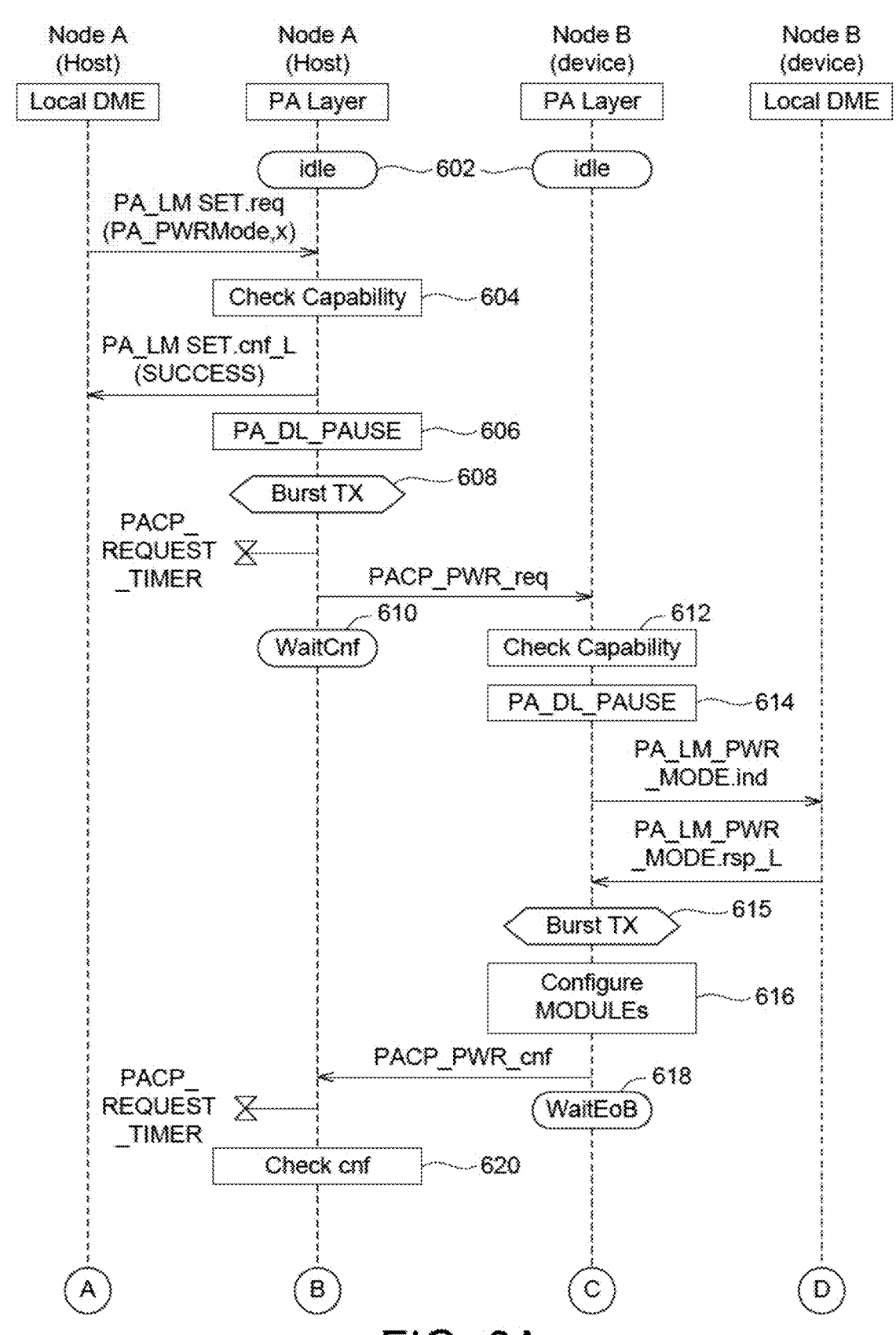
FIG. 6A, FIG. 6B and FIG. 6C show power mode change with link equalization training flow in one embodiment of the application.
Figure 6B:
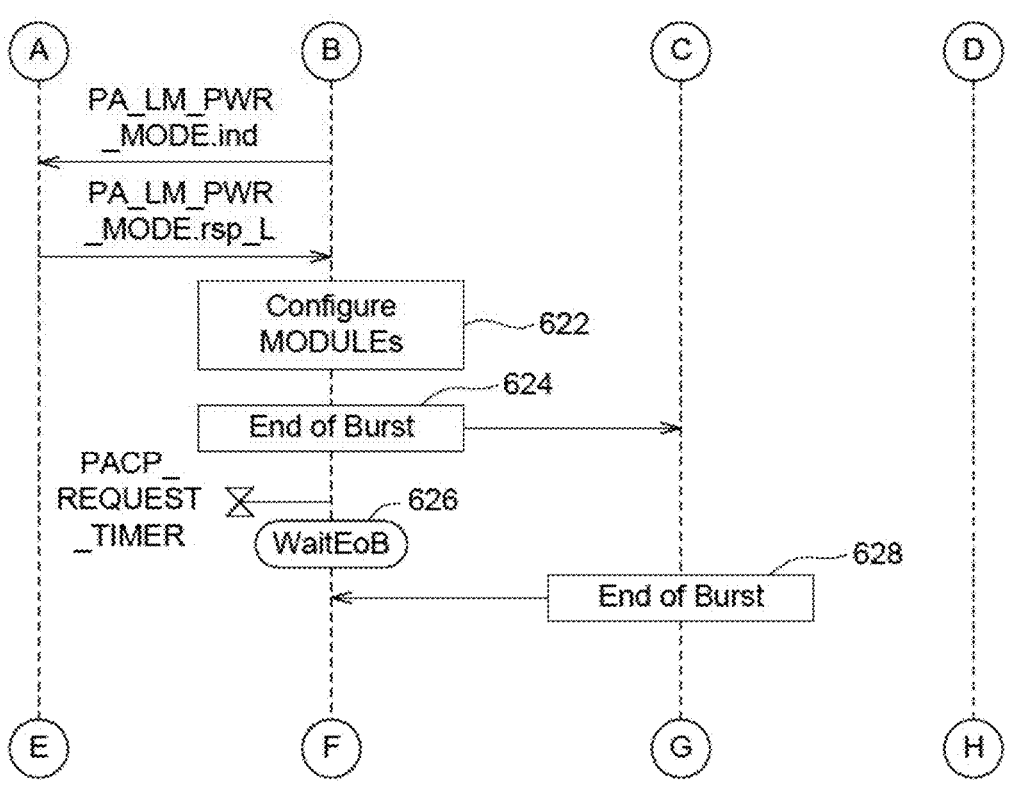
Figure 6C:
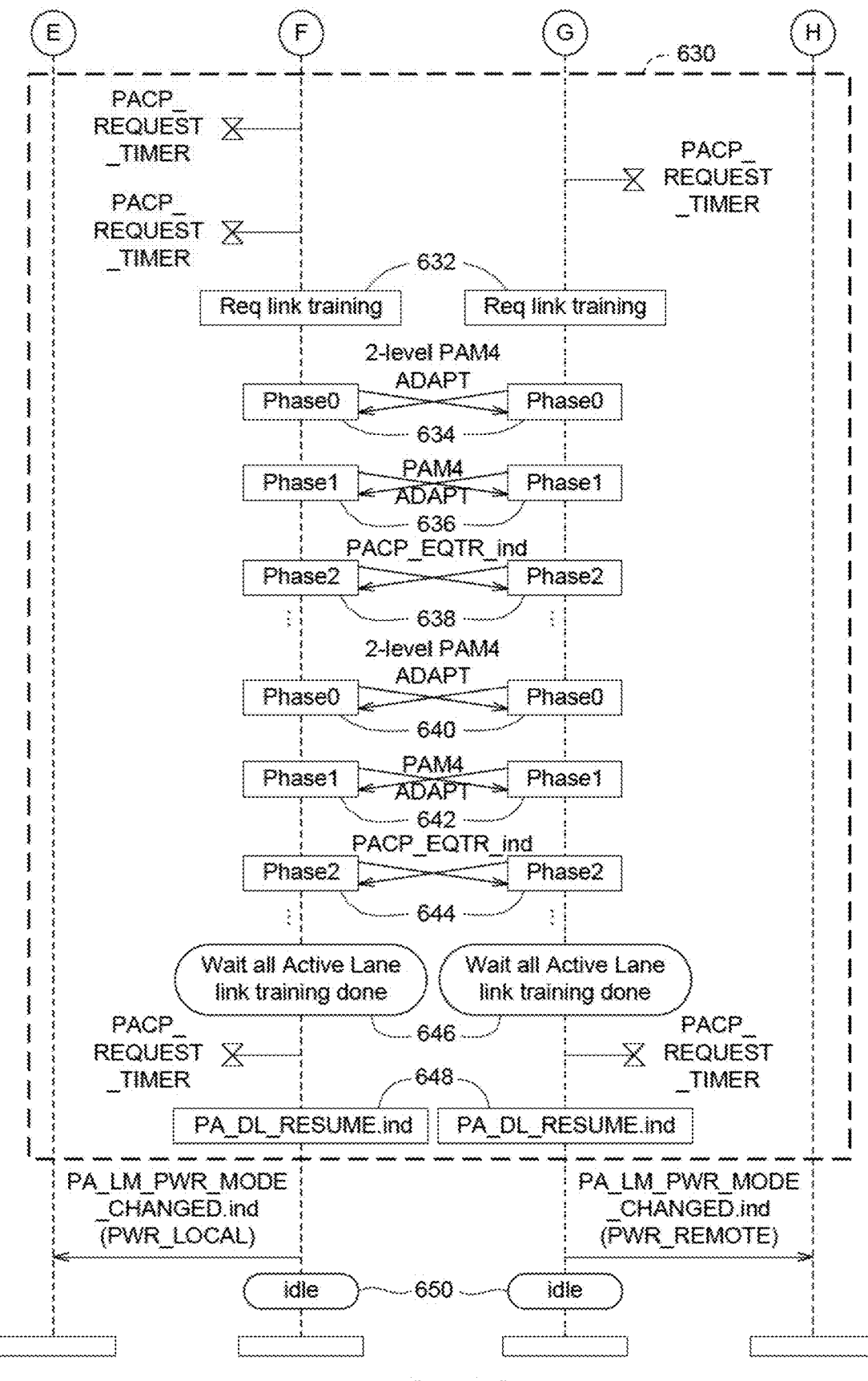

FIG. 6A, FIG. 6B and FIG. 6C show power mode change with link equalization training flow in one embodiment of the application. In FIG. 6A, FIG. 6B and FIG. 6C, the node A acts as host while the node B acts as device (i.e. the client). Of course, the node A can act as device while the node A can act as host.

In step 602, the PA layer of the node A and the PA layer of the node B are both in idle.

In step 604, after receiving a frame PA_LM_SET_req (PA_PWRMode,x), the PA layer of the node A checks capability and sends back a frame PA_LM_SET.cnfL (SUCCESS) back to the local DME (device management entity) of the node A.

In step 606, the PA layer of the node A is paused (PA_DL_Pause).

In step 608, the PA layer of the node A performs burst transmission.

In step 610, the PA layer of the node A waits for configuration.

In step 612, the PA layer of the node B performs check capability after receiving a request frame PACP_PWR_req from the PA layer of the node A.

In step 614, the PA layer of the node B is paused (PA_DL_Pause).

In step 615, the PA layer of the node B does burst transmission.

In step 616, the PA layer of the node B configures modules.

In step 618, the PA layer of the node B waits for end of burst.

In step 620, the PA layer of the node A checks configuration.

In step 622, the PA layer of the node A configures modules.

In step 624, the PA layer of the node B ends of burst.

In step 626, the PA layer of the node A waits for end of burst.

In step 628, the PA layer of the node B ends of burst.

Step 630 includes steps 632-648, which are the same or similar to the steps in FIG. 4. Thus, details of steps 632-648 are omitted here.

In step 650, the PA layer of the node A and the PA layer of the node B enters into the idle state.

Now how to increase reliability of information exchange in phase 2 is described. As known, in phase 2, the PCAP frames are used to exchange information between two nodes. When 2-level PAM-N signals have large amount errors (for example, when bit error rate of M-PHY is higher than $10^{-4}$), there needs a mechanism to ensure that information received by two nodes are the same and synchronous, to increase reliability of information exchange in phase 2.

In one embodiment of the application, a robust handshake mechanism is provided to make sure that two nodes receive the same information when information exchange included in PACP frames are exchanged in high speed data rate.

One example of the PACP frame is as: PACP_EQTRz_ind (x,y). The parameter "x" is an indicator "Det_EQTR_ind" for detecting equalization information frame, wherein "x=1" refers to that the equalization information frame is detected. The parameter "y" is an indicator for indicating RX link equalization training interruption request "RX_LT_IRQ" if any error event occurs, wherein "y=1" refers to there exists a RX link equalization training interruption request. The parameter "z" is an indicator for whether RX link equalization training is done or not, where "z=0" indicates that RX link equalization training was not done, and "z=1" indicates that RX link equalization training for all active lanes in the same sub-link are all done.

Figure 7A:
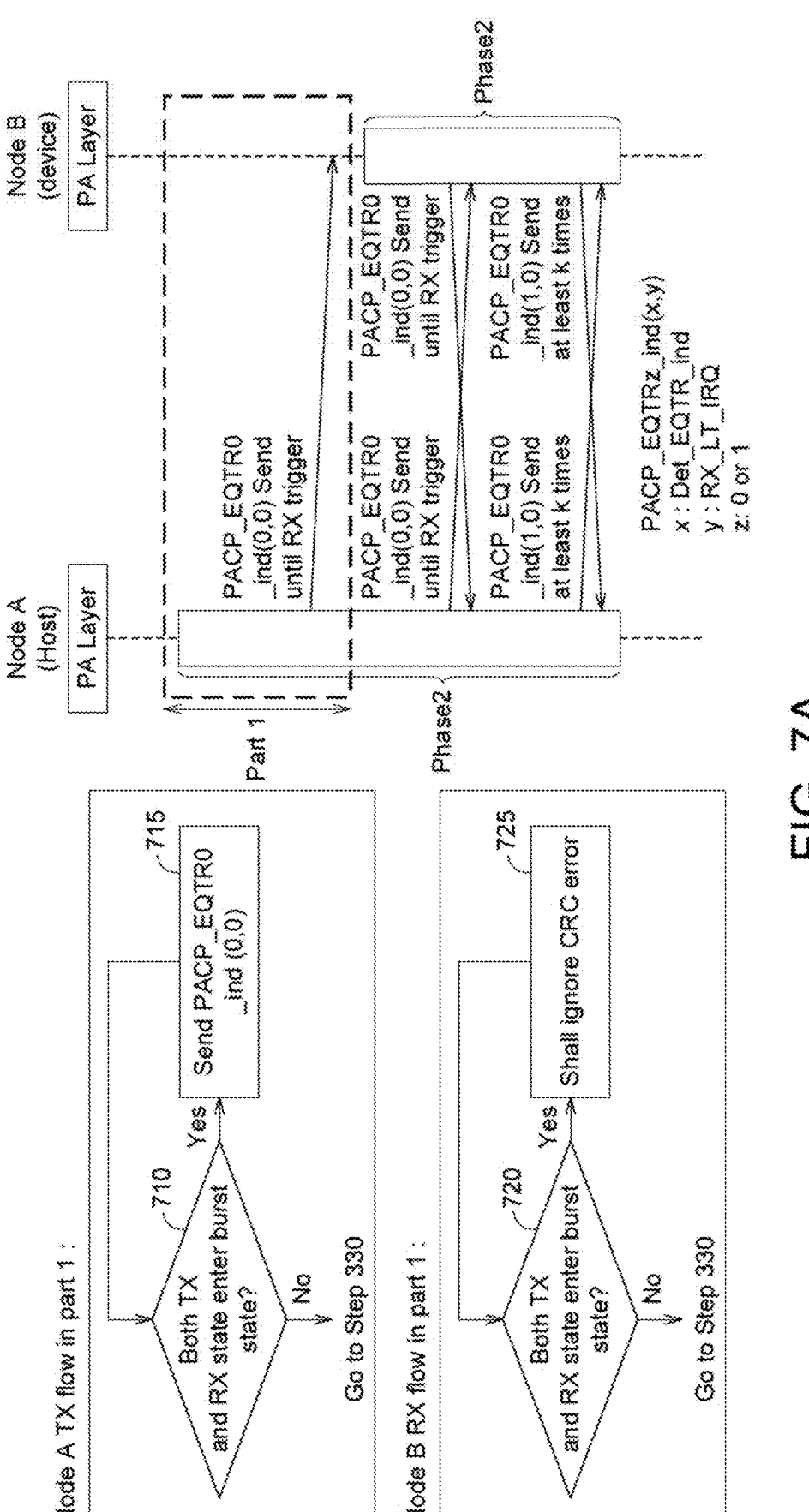
FIG. 7A, FIG. 7B and FIG. 7C show flow in the third phase (phase 2) of the link equalization training according to one embodiment of the application.
Figure 7B:
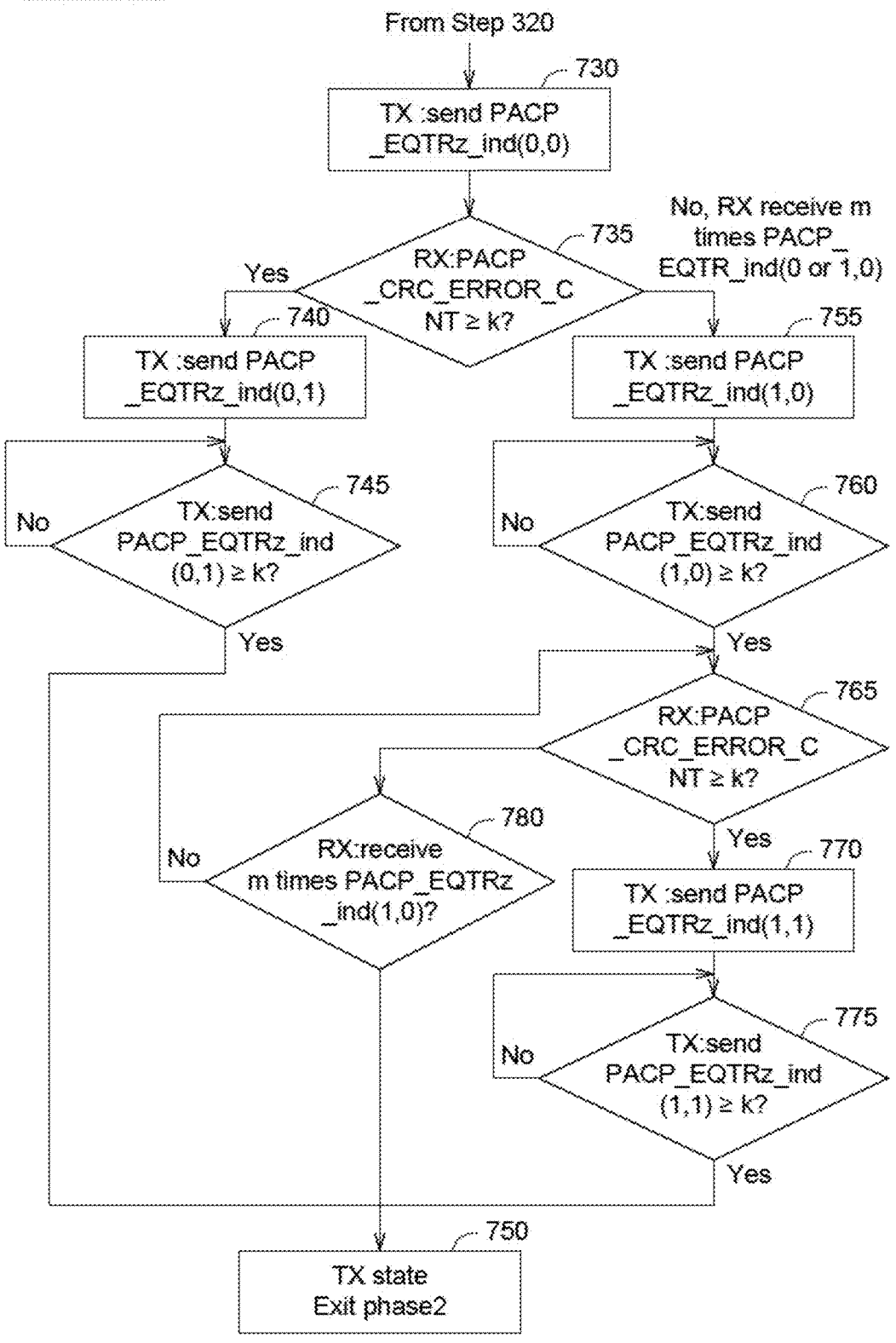
Figure 7C:
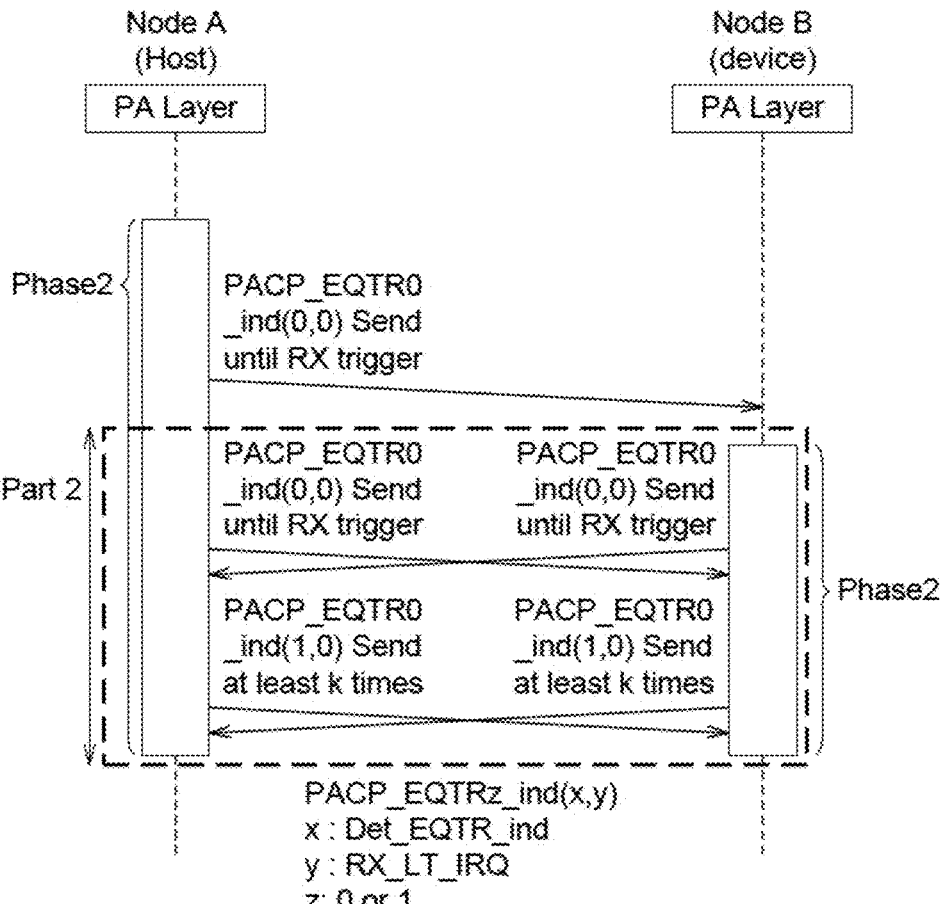

FIG. 7A, FIG. 7B and FIG. 7C show flow in the third phase (phase 2) of the link equalization training flow according to one embodiment of the application. FIG. 7A shows flow before both the transmitter of the node A and the receiver of the node B enter burst state in the third phase (phase 2) of the link equalization training according to one embodiment of the application. FIG. 7B and FIG. 7C show flow after both the transmitter of the node A and the receiver of the node B enter burst state in the third phase (phase 2) of the link equalization training according to one embodiment of the application.

In FIG. 7A, the entry time into the phase 2 may vary between the two nodes A and B. FIG. 7A shows the node A enters into the phase 2 before the node B, but the application is not limited by this. Phase 2 of the link equalization training includes part 1 and part 2.

In step 710 of part 1 of the phase 2, whether both the transmitter of the node A and the receiver of the node B enter into burst state is determined. When step 710 is yes, the flow proceeds to step 330. When step 710 is no, the flow proceeds to step 715. In step 715, the transmitter of the node A sends information exchange frame PACP_EQTR0_ind(0,0) to the receiver of the node B.

In step 720 of part 1 of the phase 2, whether both the transmitter of the node A and the receiver of the node B enter into burst state is determined. When step 720 is yes, the flow proceeds to step 330. When step 720 is no, the flow proceeds to step 725. In step 725, the receiver of the node B shall ignore Cyclic redundancy check (CRC) errors if any.

Now please refer to FIG. 7B and FIG. 7C. FIG. 7B and FIG. 7C show the behavior of the transmitters of the nodes A and B in the second part of the phase 2. In step 730, the transmitter of the node A sends the information exchange frame PACP_EQTRz_ind(0,0) to the receiver of the node B.

In step 735, the receiver of the node A determines that whether the error counter PACP_CRC_ERROR_CNT (which is sent from the transmitter of the node B) is higher than an error counter threshold k (k being a used-defined natural number) or not. The error counter PACP_CRC_ERROR_CNT is used to indicate the error count. When an error (for example but not limited by CRC error) is found by the receiver of the node B, the error counter PACP_CRC_ERROR_CNT is updated (for example, increased by 1). When the error counter PACP_CRC_ERROR_CNT reaches the error counter threshold k, an error event occurs and then the error counter PACP_CRC_ERROR_CNT is freeze (which is optional).

When step 735 is yes, the flow proceeds to step 740; and when step 735 is no, the flow proceeds to step 755.

In step 740, the transmitter of the node A sends the information exchange frame PACP_EQTRz_ind(0,1) (wherein y=1) to the receiver of the node B to indicate that the transmitter of the node A acknowledges an RX link equalization training interruption request.

In step 745, whether the transmitter of the node A sends the information exchange frame PACP_EQTRz_ind(0,1) (wherein y=1) to the receiver of the node B in k times or more than k times is determined. When the step 745 is yes, the flow proceeds to step 750 and the transmitter of the node exits phase 2. When the step 745 is no, the flow repeats step 745.

In step 755, when the step 735 is no and the receiver of the node B receives the information exchange frame PACP_EQTRz_ind(0 or 1, 0) m times, the transmitter of the node A sends the information exchange frame PACP_EQTRz_ind(1,0) (wherein x=1) to the receiver of the node B to indicate detection of equalization training.

In step 760, whether the transmitter of the node A sends the information exchange frame PACP_EQTRz_ind(1,0) (wherein x=1) k times or not is determined. When step 760 is no, step 760 is repeated. When step 760 is yes, the flow proceeds to step 765.

In step 765, the receiver of the node A determines that whether the error counter PACP_CRC_ERROR_CNT (which is sent from the transmitter of the node B) is higher than the error counter threshold k or not. When step 765 is yes, the flow proceeds to step 770; and when step 765 is no, the flow proceeds to step 780.

In step 770, the transmitter of the node A sends the information exchange frame PACP_EQTRz_ind(1,1) (wherein x=1 and y=1) to the receiver of the node B to indicate that the transmitter of the node A acknowledges RX link equalization interruption request.

In step 775, whether the transmitter of the node A sends the information exchange frame PACP_EQTRz_ind(1,1) (wherein x=1 and y=1) to the receiver of the node B in k times or more than k times is determined. When the step 775 is yes, the flow proceeds to step 750 and the transmitter of the node A exits phase 2. When the step 775 is no, the flow repeats step 775.

In step 780, whether the receiver of the node A receives the information exchange frame PACP_EQTRz_ind(1, 0) (which is sent from the transmitter of the node B) in m times or not. When the step 780 is yes, the flow proceeds to step 750 and the transmitter of the node exits phase 2. When the step 780 is no, the flow returns to step 765.

Figure 8A:
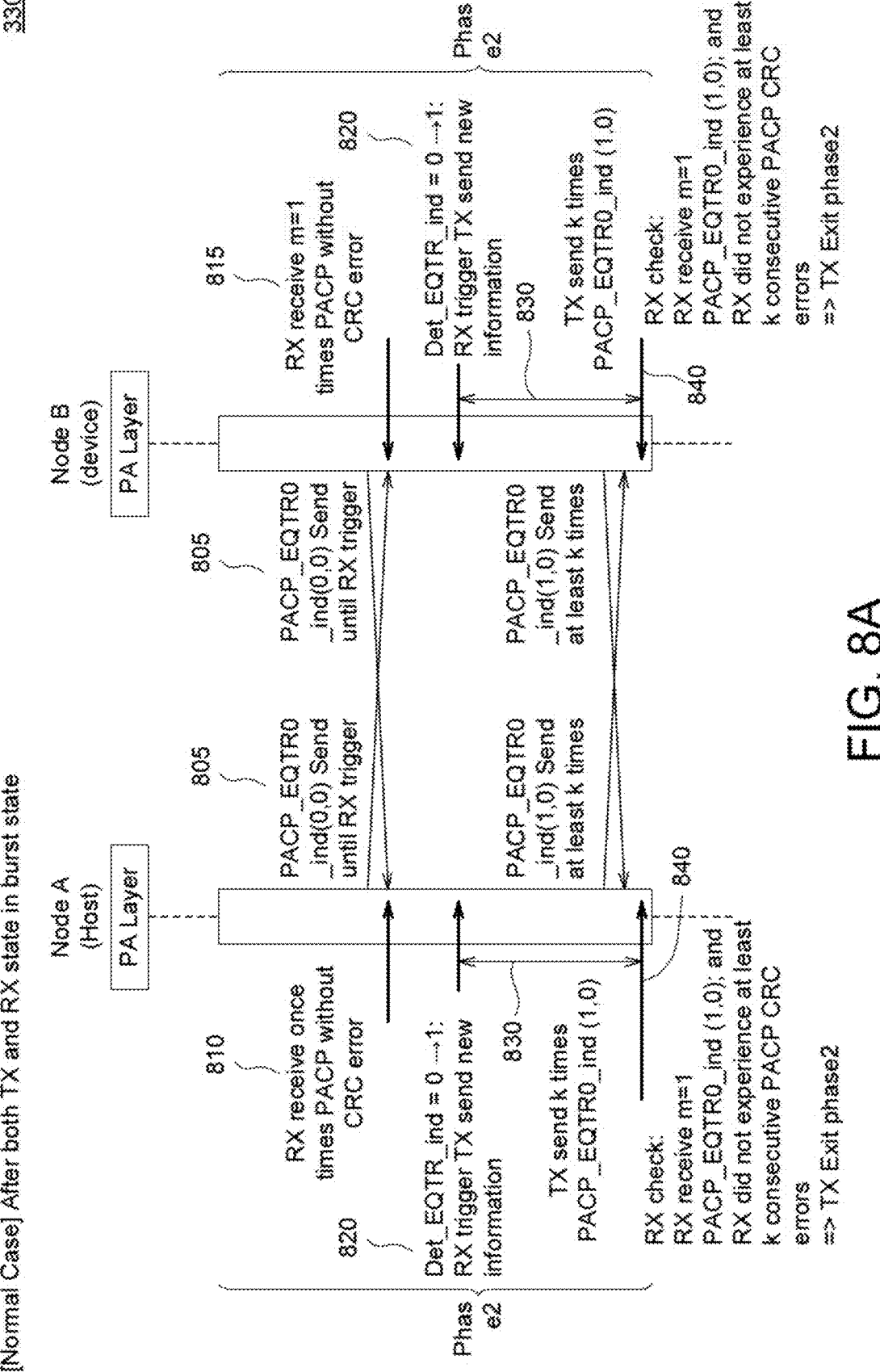
FIG. 8A shows normal case after both the transmitter of the node A and the receiver of the node B enter into burst state in phase 2 of the link equalization training.

FIG. 8A shows normal case after both the transmitter of the node A and the receiver of the node B enter into burst state in phase 2 of the link equalization training.

In step 805, the TXs (transmitter) of the nodes A and B send the information exchange frame PACP_EQTR0_ind(0, 0) to each other until the receivers (RX) of the nodes A and B trigger.

In step 810, the RX of the node A receives once time PACT frames without CRC errors. In step 815, the RX of the node B receives m=1 time(s) PACT frames without CRC errors.

In step 820, the parameter "x" (Det_EQTR_ind) is changed from 0 to 1, and the receivers of the nodes A and B trigger the TXs of the nodes A and B to send new information exchange frame PACP_EQTR0_ind(1,0) to the RX of the other node.

In step 830, the TXs of the nodes A and B send the information exchange frame PACP_EQTR0_ind(1,0) to each other at least k times.

In step 840, the RXs of the nodes A and B check: (1) RXs of the nodes A and B receive the information exchange frame PACP_EQTR0_ind(1,0) 1 (m=1) time; and (2) the RXs of the nodes A and B did not experience at least k consecutive PACP CRC errors. When the above two conditions are met, the link equalization training flow is not interrupted and the TXs of the nodes A and B exit the third phase (phase 2).

On the other hand, after the TXs of the nodes A and B send the information exchange frame PACP_EQTRz_ind(0,1) at least k times, the link equalization training flow is interrupted, and the TXs of the nodes A and B exit the third phase (phase 2).

Or, after the TXs of the nodes A and B send the information exchange frame PACP_EQTRz_ind(1,1) at least k times, the link equalization training flow is interrupted, and the TXs of the nodes A and B exit the third phase (phase 2).

Or, after a link equalization training timer "PACP_LINK_TRAINING_TIMER" is timeout, the link equalization training flow is interrupted, and the TXs of the nodes A and B exit the third phase (phase 2).

In one embodiment of the application, there are two cases (case 1 and case 2) to ensure the link equalization training flow is interrupted, which is described below.

Figure 8B:
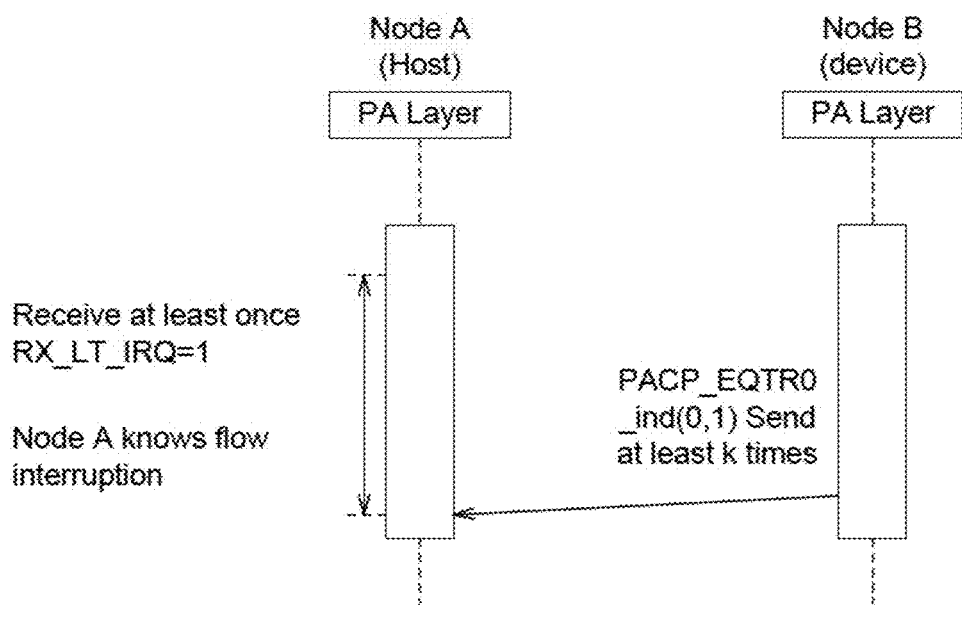
FIG. 8B shows the first case (case 1) in ensuring that the link equalization training flow is interrupted in one embodiment of the application.

FIG. 8B shows the first case (case 1) in ensuring that the link equalization training flow is interrupted in one embodiment of the application. In Case 1, when the receiver of the node A receives once the information exchange frame PACP_EQTRz_ind(x, 1) (y=1, regardless of x and z), the receiver of the node A determines that the receiver of the node B experiences at least k consecutive PACP CRC errors, and the node B has no sufficient good receiving quality. If so, the link equalization training flow is interrupted.

Figure 8C:
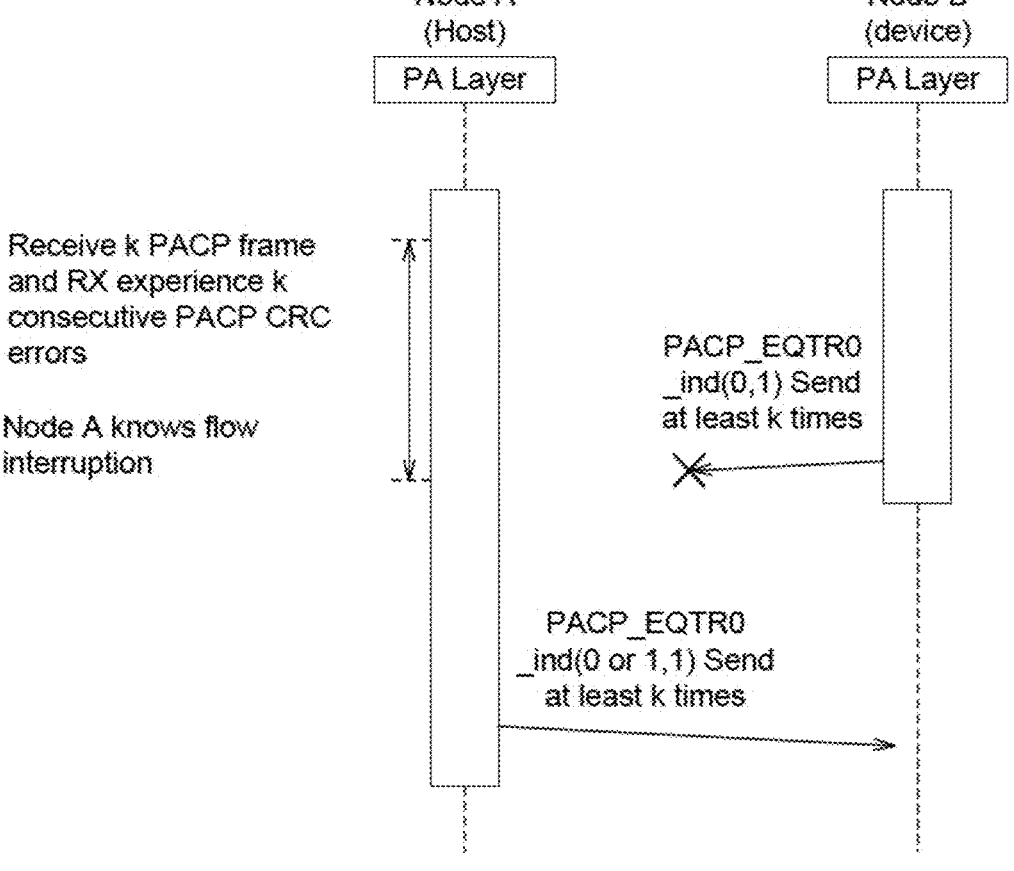
FIG. 8C shows the second case (case 2) in ensuring that the link equalization training flow is interrupted in one embodiment of the application.

FIG. 8C shows the second case (case 2) in ensuring that the link equalization training flow is interrupted in one embodiment of the application. In Case 2, when the receiver of the node A experiences at least k consecutive PACP CRC errors, the receiver of the node A determines the node A has no sufficient good receiving quality, and the TX of the node A sends the information exchange frame PACP_EQTRz_ind (x, 1) (y=1) to node B. If so, the link equalization training flow is interrupted.

If any of the above cases 1 and 2 occurs, the link equalization training flow is interrupted.

In one example, steps 730, 735, 755, 760, 765 and 780 show "no link equalization training flow interruption" in one embodiment of the application.

In one example, steps 730, 735, 740, and 745 show "link equalization training flow interruption (case 1)" in one embodiment of the application.

In one example, steps 730, 735, 755, 762, 765, 770 and 775 show "link equalization training flow interruption (case 2)" in one embodiment of the application.

In one embodiment of the application, when the receiver of the node triggers event for information change (changing parameter x or y), the TX of the node needs to send at least k times PACP_EQTRz_ind(z=0 or 1). Information change is for example, (1) the parameter "x" (Det_EQTR_ind) is changed from 0 to 1 to detect m times PACP_EQTRz_ind, wherein m<k; (2) the parameter "y" (RX_LT_IRQ) is changed from 0 to 1, the RX experiences at least k consecutive PACP CRC errors.

In one embodiment of the application, when the RX of the node receives EOB (end of burst), the RX of the node exits phase 2.

Figure 9:
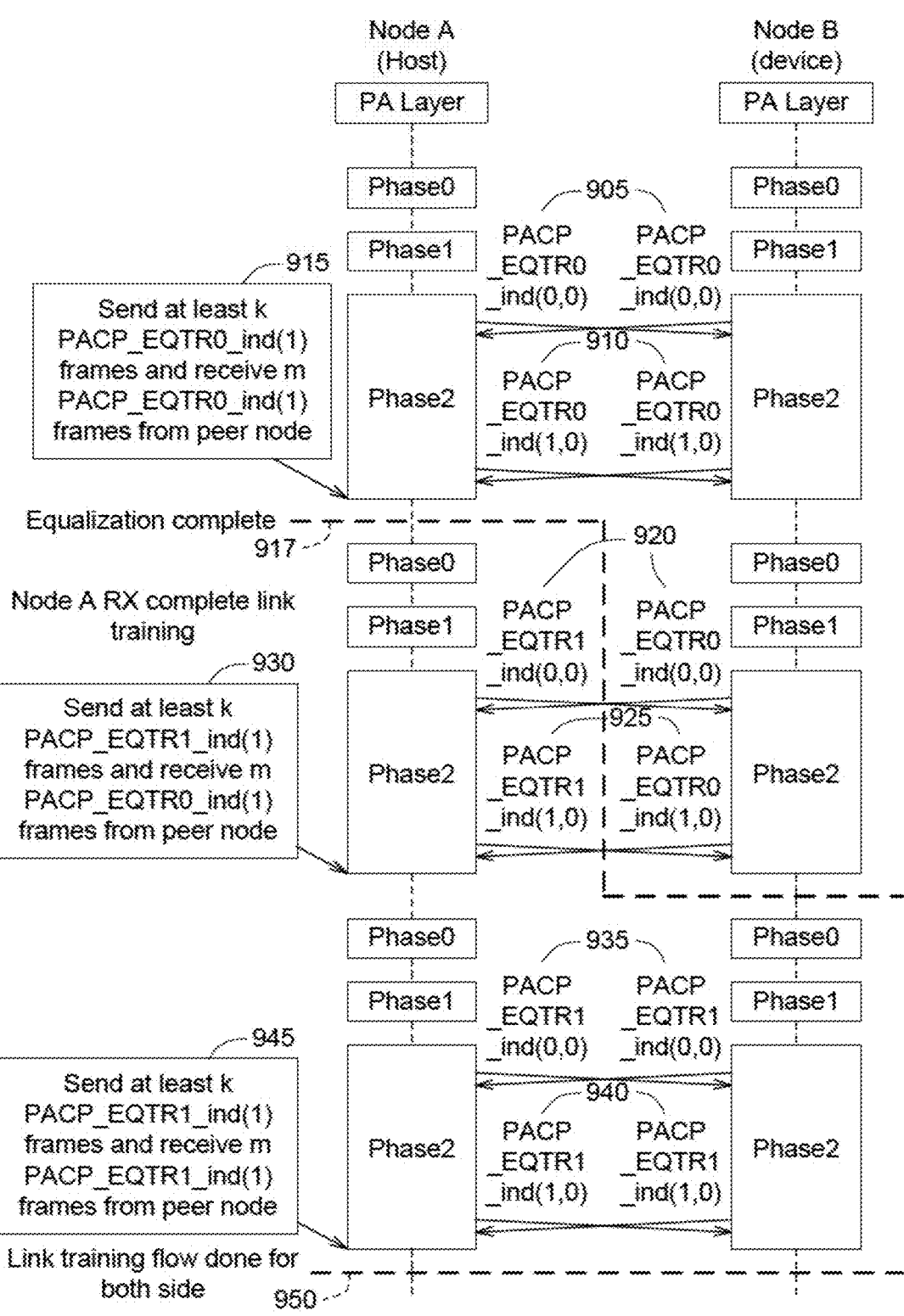
FIG. 9 shows link equalization training done flow according to one embodiment of the application.

FIG. 9 shows link equalization training done flow according to one embodiment of the application. FIG. 9 is performed when step 340 is yes. In one embodiment of the application, if all active lanes on the same side have link equalization training done, the TX of the node sends the information exchange frame PACP_EQTR1_ind(z=1).

Also, in one embodiment of the application, the condition of successfully changing information in phase 2 is that the TX of the node A only sends the information exchange frame PACP_EQTR1_ind(1,0) and the receiver of the Node A only receives the information exchange frame PACP_EQTR1_ind(1,0). If so, link equalization training on all active lanes on both nodes is done.

In step 905, the TXs of the nodes A and B send the information exchange frame PACP_EQTR0_ind(0,0) to each other.

In step 910, the TXs of the nodes A and B send the information exchange frame PACP_EQTR0_ind(1,0) to each other.

In step 915, the node A sends at least k information exchange frames PACP_EQTR0_ind(1) and receives m information exchange frames PACP_EQTR0_ind(1) from the other node.

In step 917, the link equalization is completed.

In step 920, the TX of the node A sends the information exchange frame PACP_EQTR1_ind(0,0) to the node B because the node A completes link training, while the TX of the node B sends the information exchange frame PACP_EQTR0_ind(0,0) to the node A.

In step 925, because the node A completes link training, the TX of the node A sends the information exchange frame PACP_EQTR1_ind(1,0) to the node B after receiving the information exchange frame PACP_EQTR0_ind(0,0) from the node.

In step 930, the node A sends at least k information exchange frames PACP_EQTR1_ind(1) and receives m information exchange frames PACP_EQTR0_ind(1) from the other node.

In step 935, the TXs of the nodes A and B send the information exchange frame PACP_EQTR1_ind(0,0) to each other because both the nodes A and B complete link training.

In step 940, the TXs of the nodes A and B send the information exchange frame PACP_EQTR1_ind(1,0) to each other.

In step 945, the node A sends at least k information exchange frames PACP_EQTR1_ind(1) and receives m information exchange frames PACP_EQTR1_ind(1) from the other node.

In step 950, link equalization training on all active lanes on both nodes is done.

In the following, how to deal with the error events in link equalization training flow is described in one embodiment of the application.

In one embodiment of the application, the link equalization training decision mechanism (i.e. step 350 of FIG. 3) is used to: determine what actions should be taken in the events of interruption of the link equalization training flow; and define the actions for different link equalization training modes.

Figure 10:
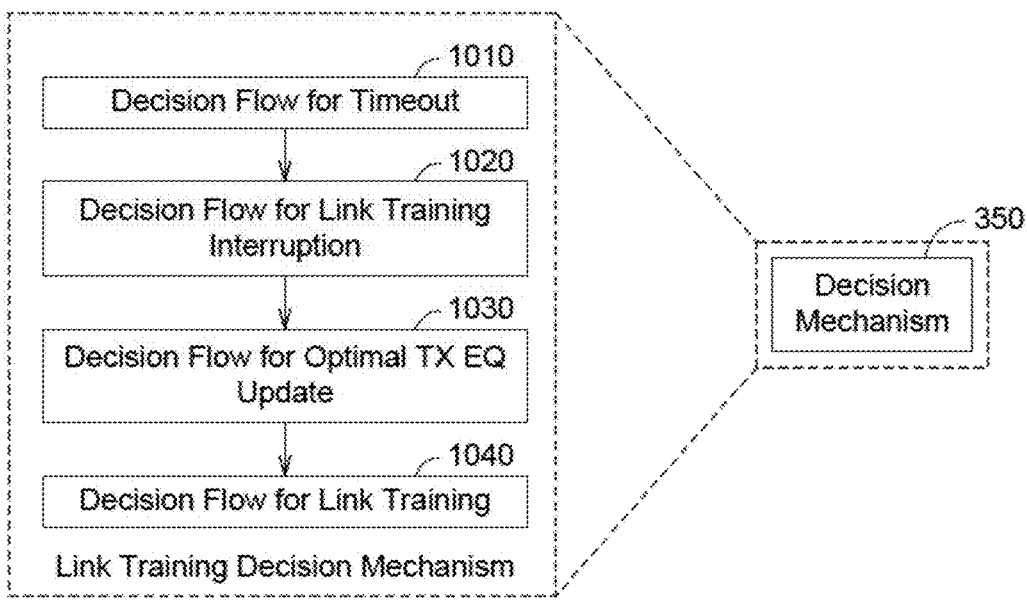
FIG. 10 shows a flow for the link equalization training decision mechanism according to one embodiment of the application.

FIG. 10 shows a flow for the link equalization training decision mechanism according to one embodiment of the application.

The decision mechanism includes: (1010) decision flow for timeout; (1020) decision flow for link equalization training interruption; (1030) decision flow for optimal TX equalization update; and (1040) decision flow for link equalization training.

FIG. 11A to FIG. 11D show decision flow for timeout (1010) of the decision mechanism according to one embodiment of the application.

In step 1105, the phase 2 of the step 340 is end.

In step 1110, the following information are read from the information exchange frame PACP_EQTR0_ind: RX_TXEQReq_Lx, RX_Opt_TXEQ_Lx, RX_EQ_Done_Lx, All_TXEQ_Tried_Lx, and RX_LT_IRQ. The information RX_TXEQReq_Lx, RX_Opt_TXEQ_Lx, RX_EQ_Done_Lx, All_TXEQ_Tried_Lx, and RX_LT_IRQ are written into the following registers respectively: LTDM_PeerTxEqReqLx, LTDM_PeerOptTxEqLx, LTDM_PeerRxEqDoneLx, LTDM_PeerAllTxEqTriedLx, and LTDM_Peer_LT_IRQ. "Lx" refers to the lane x (x being a natural number).

The information RX_TXEQReq_Lx indicates which TX equalization gear (i.e. the FFE gear) of the node A is requested by the receiver of the node B in the next round.

The information RX_Opt_TXEQ_Lx indicates which TX equalization gear of the node A is optimal.

The information RX_EQ_Done_Lx indicates that the link equalization training of the node B is done.

The information All_TXEQ_Tried_Lx indicates that all TX equalization gears are tried.

The information RX_LT_IRQ indicates a link equalization training flow is interrupted.

In step 1115, whether the link equalization training timer LT_timer is timeout is determined. When the step 1115 is no, the flow proceeds to step 1120; and when the step 1115 is yes, the flow proceeds to step 1125. The reason that the link equalization training timer LT_timer is timeout is that an inappropriate TX equalization gear is used in phase 2, which leads to RX inability to find the symbol boundary.

Figure 12A:
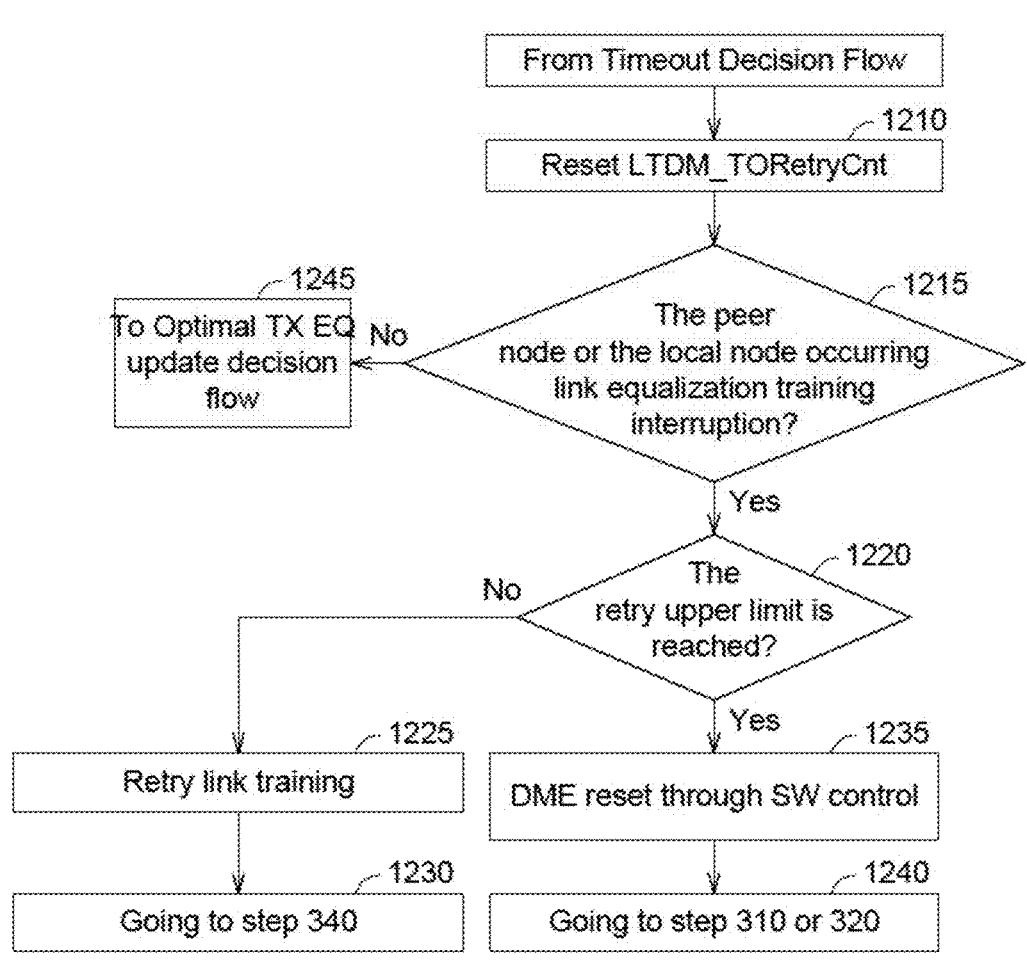
FIG. 12A to FIG. 12C show decision flow for link equalization training interruption (1020) of the decision mechanism according to one embodiment of the application.
Figure 12B:
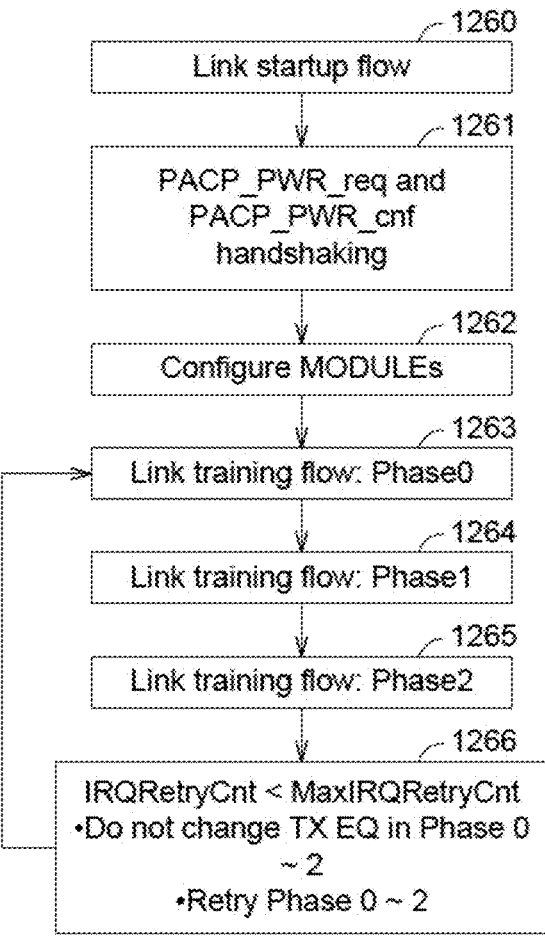
Figure 12C:
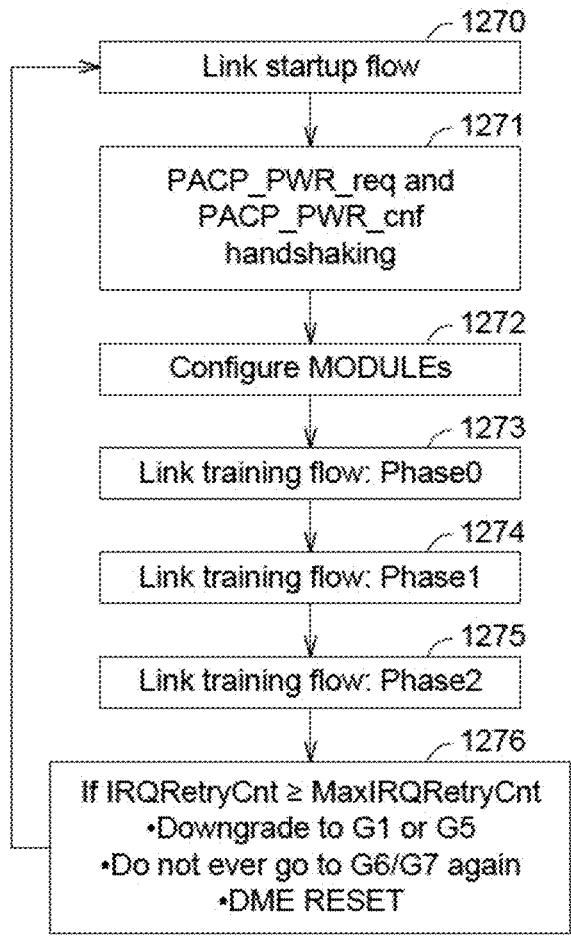

In step 1120, a decision flow for link equalization training interruption is performed, which is described in FIG. 12A to FIG. 12C.

In step 1125, whether timeout of the link equalization training timer LT_timer is first time is determined. When the step 1125 is yes, the flow proceeds to step 1130; and when the step 1125 is no, the flow proceeds to step 1140.

In step 1130, the initial TX equalization gear is changed, the TX equalization gear in phase 0 and phase 1 is unchanged; and the link equalization training is retried. Step 1130 is also called as case B. After step 1130, the flow goes to step 1150. In step 1130, the reason to change the initial TX equalization gear is because the initial TX equalization gear is not appropriate due to environment factor and thus another TX equalization gear is used for retrying.

In step 1140, whether the retry upper limit is reached is determined. When the step 1140 is yes, the flow proceeds to step 1145; and when the step 1140 is no, the flow proceeds to step 1155.

In step 1145, DME is reset through software control. In step 1150, the decision mechanism goes to step 310 or step 320. Steps 1145 and 1150 are called as case A.

In step 1155, when the timeout of the link equalization training timer LT_timer is not the first time, the initial TX equalization gear is unchanged, the TX equalization gear in the first phase, the second phase and the third phase is not changed; and the link equalization training is retried. After step 1155, the flow goes to step 1150.

Figure 11A:
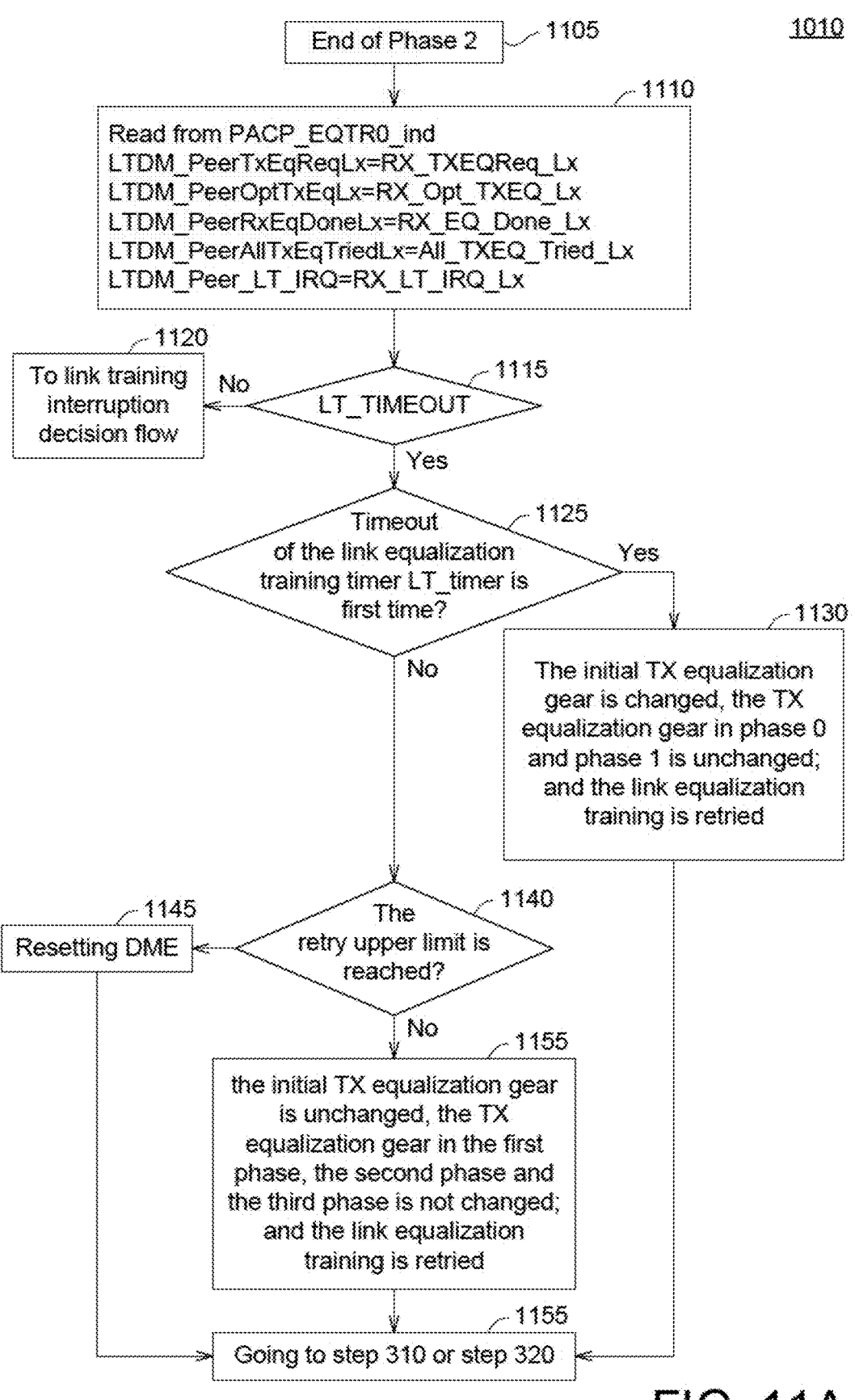
FIG. 11A to FIG. 11D show decision flow for timeout (1010) of the decision mechanism according to one embodiment of the application.
Figure 11B:
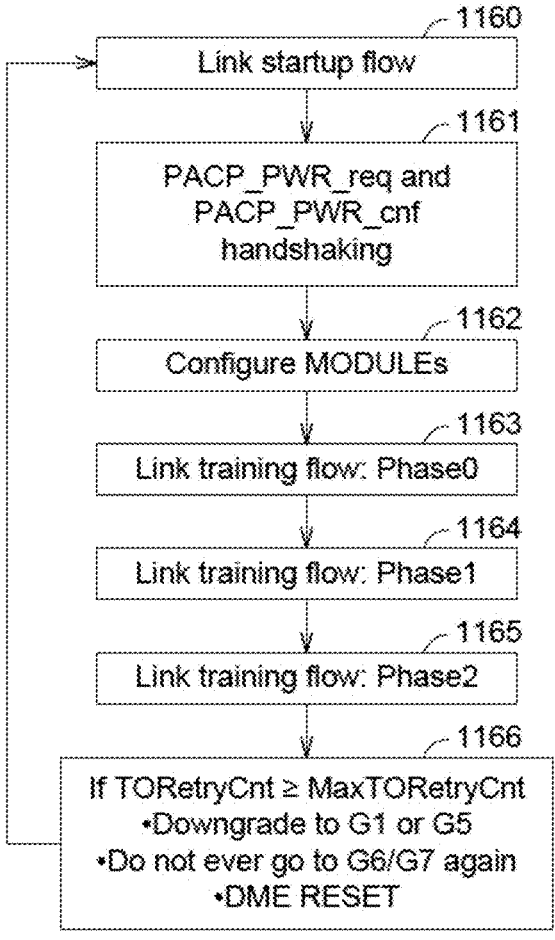

FIG. 11B shows details of case A. In step 1160, a link startup flow is performed. In step 1161, the two nodes perform frames PACP_PWR_req and PACP_PWR_cnf handshake, wherein frames PACP_PWR_req and PACP_PWR_cnf are used for power mode change flow. In step 1162, modules are configured. In step 1163, a phase 0 link equalization training flow is performed, which is discussed above. In step 1164, a phase 1 link equalization training flow is performed, which is discussed above. In step 1165, a phase 2 link equalization training flow is performed, which is discussed above. In step 1166, if timeout retry counter TORetryCnt is equal to or higher than the maximum timeout retry counter MaxTORetryCnt (TORetryCnt≥Max-TORetryCnt), then the decision mechanism decides that (1) the data transfer rate is downgraded to HS-G1, HS-G2, HS-G3, HS-G4 or HS-G5; (2) the data transfer rate does not ever go to HS-G6 (high-speed gear 6) or HS-G7 (high-speed gear 7) again; and (3) DME is reset. Steps 1161-1166 are a power mode change flow.

Figure 11C:
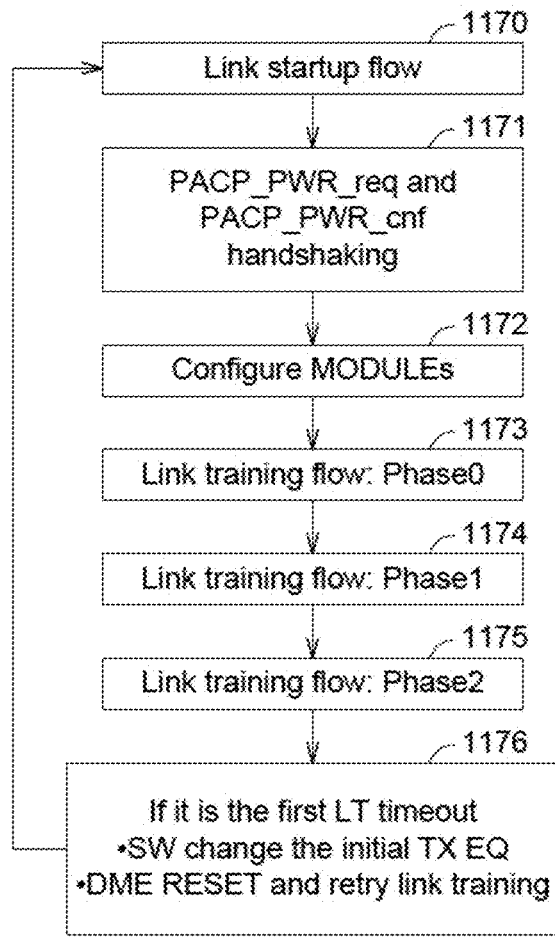

FIG. 11C shows details of case B. In step 1170, a link startup flow is performed. In step 1171, the two nodes perform frames PACP_PWR_req and PACP_PWR_cnf handshake. In step 1172, modules are configured. In step 1173, a phase 0 link equalization training flow is performed, which is discussed above. In step 1174, a phase 1 link equalization training flow is performed, which is discussed above. In step 1175, a phase 2 link equalization training flow is performed, which is discussed above. In step 1176, if it is the first link equalization training timer timeout, then the decision mechanism determines that the initial TX equal-ization is changed by software, DME is reset and link equalization training is retried. Steps 1171-1176 are a power mode change flow.

Figure 11D:
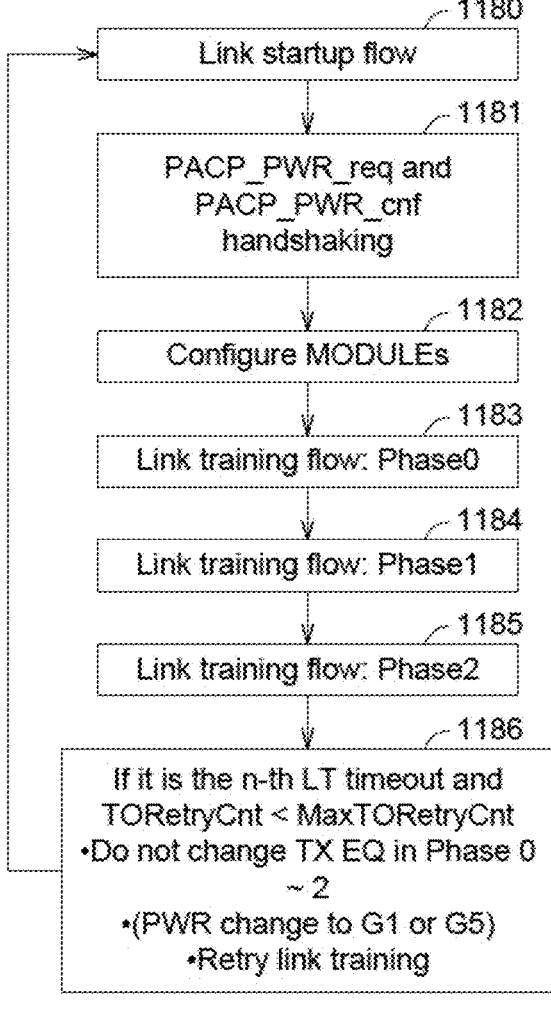

FIG. 11D shows details of case C. In step 1180, a link startup flow is performed. In step 1181, the two nodes perform frames PACP_PWR_req and PACP_PWR_cnf handshake. In step 1182, modules are configured. In step 1183, a phase 0 link equalization training flow is performed, which is discussed above. In step 1184, a phase 1 link equalization training flow is performed, which is discussed above. In step 1185, a phase 2 link equalization training flow is performed, which is discussed above. In step 1186, if the link equalization training timer timeout is second time or more times and the timeout retry counter TORetryCnt is lower than the maximum timeout retry counter MaxTORe-tryCnt (TORetryCnt<MaxTORetryCnt), then the decision mechanism determines that (1) the EX equalization gear in phase 0 to phase 2 is not changed; the data transfer rate is downgraded to HS-G1, HS-G2, HS-G3, HS-G4 or HS-G5; and (3) link equalization training is retried.

FIG. 12A to FIG. 12C show decision flow for link equalization training interruption (1020) of the decision mechanism according to one embodiment of the application. The decision flow for link equalization training interruption (1020) begins from the decision flow for timeout (1010).

In step 1210, a link equalization training timeout retry counter LTDM_TORertyCnt is reset.

In step 1215, whether the peer node or the local node occurs link equalization training interruption is determined. When step 1215 is yes, the flow proceeds to step 1220; and when step 1215 is no, the flow proceeds to step 1245.

In step 1220, whether the retry upper limit is reached is determined. When step 1220 is no, the flow proceeds to step 1225; and when step 1220 is yes, the flow proceeds to step 1235.

In step 1225, link equalization training is retried and in step 1230, the decision mechanism goes to step 340. This is case D.

In step 1235, the DME is reset through software control; and in step 1240, the decision mechanism goes to step 310 or 320. This is case E.

In step 1245, the decision mechanism goes to decision flow for optimal TX equalization update (1030).

FIG. 12B shows details of case D. In step 1260, a link startup flow is performed. In step 1261, the two nodes perform frames PACP_PWR_req and PACP_PWR_cnf handshake. In step 1262, modules are configured. In step

1263, a phase 0 link equalization training flow is performed, which is discussed above. In step 1264, a phase 1 link equalization training flow is performed, which is discussed above. In step 1265, a phase 2 link equalization training flow is performed, which is discussed above. In step 1266, if the interrupt retry counter IRQRetryCnt is smaller than the maximum interrupt retry counter MaxIRQRetryCnt (IRQRetryCnt<MaxIRQRetryCnt), then the decision mechanism decides that (1) in phase 0 to phase 2, the TX equalization gear is not changed; and (2) phase 0 to phase 2 are retried. Steps 1261-1266 are a power mode change flow.

FIG. 12C shows details of case E. In step 1270, a link startup flow is performed. In step 1271, the two nodes perform frames PACP_PWR_req and PACP_PWR_cnf handshake. In step 1272, modules are configured. In step 1273, a phase 0 link equalization training flow is performed, which is discussed above. In step 1274, a phase 1 link equalization training flow is performed, which is discussed above. In step 1275, a phase 2 link equalization training flow is performed, which is discussed above. In step 1276, if the interrupt retry counter IRQRetryCnt is equal to or higher than the maximum interrupt retry counter MaxIRQRetryCnt (IRQRetryCnt≥MaxIRQRetryCnt), then the decision mechanism decides that (1) the data transfer rate is down-graded to HS-G1, HS-G2, HS-G3, HS-G4 or HS-G5; (2) the data transfer rate does not ever go to HS-G6 (high-speed gear 6) or HS-G7 (high-speed gear 7) again; and (3) DME is reset. Steps 1271-1276 are a power mode change flow.

Figure 13:
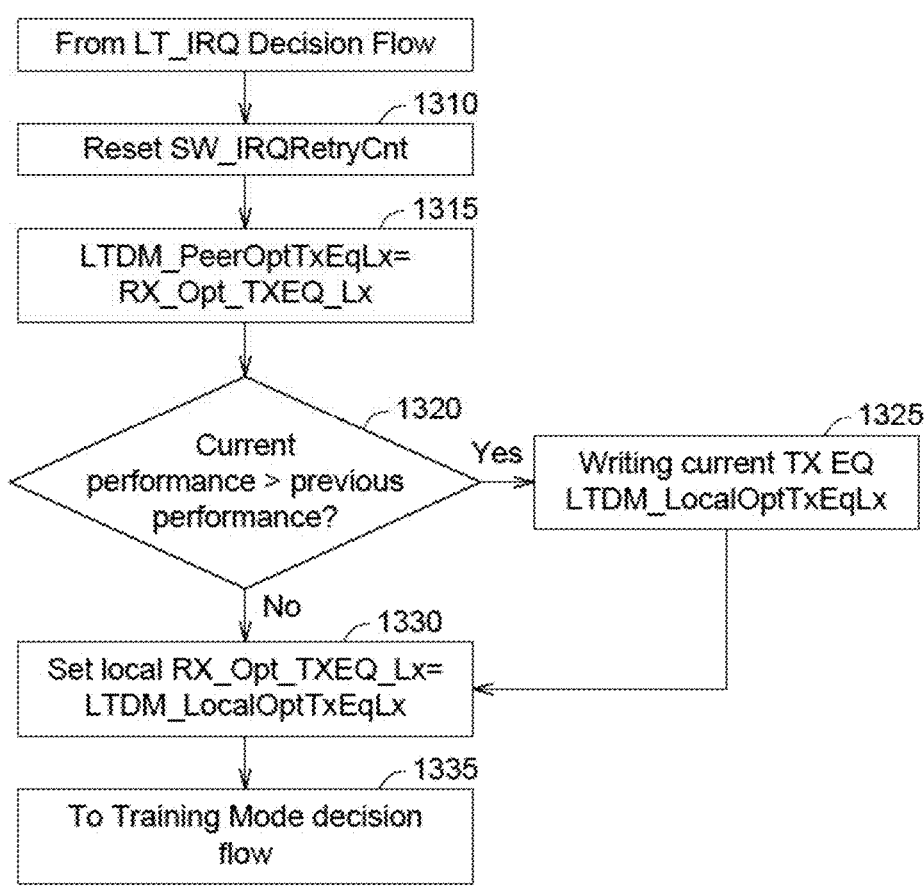
FIG. 13 shows decision flow for optimal TX equalization update (1030) of the decision mechanism according to one embodiment of the application.

FIG. 13 shows decision flow for optimal TX equalization update (1030) of the decision mechanism according to one embodiment of the application. The decision flow for opti-mal TX equalization update (1030) is performed after deci-sion flow for link equalization training interruption (1020). In step 1310, a software interrupt retry counter SW_IRQRe-tryCnt is reset. In step 1315, the information "RX_Opt_TXEQ_Lx" is written into the register LTDM_PeerOptTxEqLx.

In step 1320, whether the current performance is better than the previous performance is determined. When step 1320 is yes, the flow proceeds to step 1325; and when step 1320 is no, the flow proceeds to step 1330.

In step 1325, the current TX equalization gear is written into LTDM_LocalOptTxEqLx (i.e. the current TX equaliza-tion gear is recorded). LTDM_LocalOptTxEqLx indicates the local optimal TX equalization for lane x.

In step 1330, an local optimal RX equalization gear for lane x "RX_Opt_TXEQ_Lx" is set as "RX_Opt_TXEQ_Lx=LTDM_LocalOptTxEqLx", wherein the information local optimal RX equalization gear for lane x "RX_Opt_TXEQ_Lx" will be included in the information exchange frame PACP_EQTR0_ind and sent to the peer device in the next phase 2.

In step 1335, the flow goes to decision flow for link equalization training (1040).

In one embodiment of the application, the reason that why the optimal TX equalization updating flow is needed is that: (1) the optimal TX equalization gear in Phase 1 is recorded for further usage in local device; and (2) optimal TX equalization gear in Phase 1 is used for high-speed trans-mission.

Figure 14:
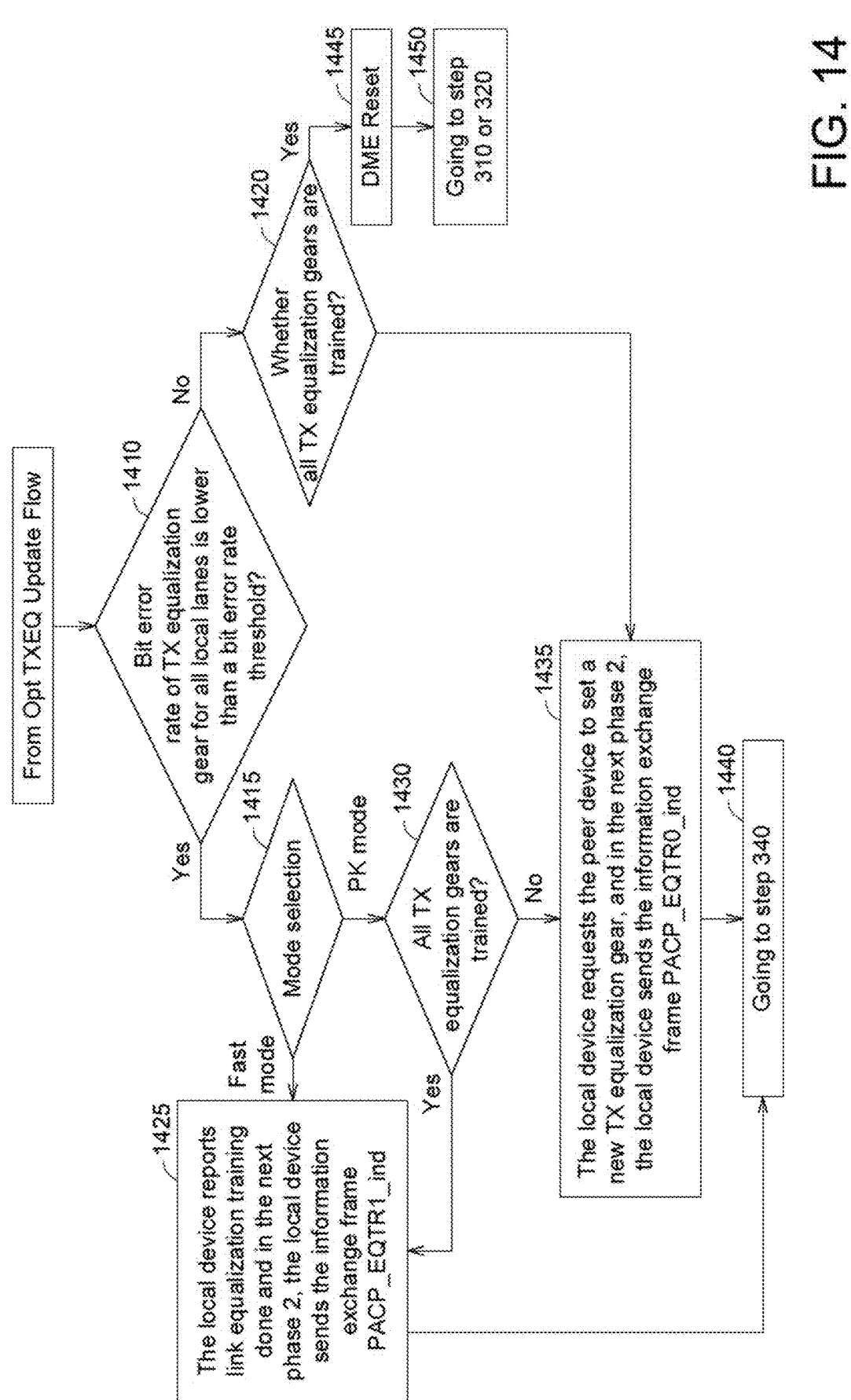
FIG. 14 shows decision flow for link equalization training (1040) of the decision mechanism according to one embodiment of the application.

FIG. 14 shows decision flow for link equalization training (1040) of the decision mechanism according to one embodi-ment of the application. The decision flow for link equal-ization training (1040) is performed after the decision flow for optimal TX equalization update (1030).

In step 1410, whether bit error rate of TX equalization gear for all local lanes is lower than a bit error rate threshold (for example but not limited by, $10^{-6}$) is determined. When step 1410 is yes, the flow proceeds to step 1415; and when step 1410 is no, the flow proceeds to step 1420.

In step 1415, the mode for link equalization training is determined. For example, the operation mode is selected from a fast mode and a PK mode. In the fast Mode, once the first TX equalization gear with acceptable performance for lane x Lx is found (e.g., bit error rate (BER)<10^-6), the lane x (Lx) reports "RX_EQ_Done=1" and does not change the required TX equalization gear until all of the active lanes in a device are RX_EQ_Done=1. In the PK mode, all available TX equalization gears must be tried to find the optimal one for the high-speed transmission.

When the fast mode is selected, in step 1425, the local device reports link equalization training done and in the next phase 2, the local device sends the information exchange frame PACP_EQTR1_ind.

When the PK mode is selected, in step 1430, whether all TX equalization gears are trained is determined. When step 1430 is yes, the flow returns to the step 1425; and when step 1430 is no, the flow proceeds to step 1435.

In step 1435, the local device requests the peer device to set a new TX equalization gear, and in the next phase 2, the local device sends the information exchange frame PACP_EQTR0_ind.

In step 1440, the flow returns to step 340.

In step 1420, whether all TX equalization gears are trained is determined. When step 1420 is yes, the flow returns to the step 1445; and when step 1420 is no, the flow proceeds to step 1435.

In step 1445, the DME is reset through software control. In step 1450, the flow returns to step 310 or 320.

One embodiment of the application defines the link equalization training process for rates above HS-G6 (high-speed gear 6). Further, for UniPro 3.0 and M-PHY 6.0, the application outlines the process for conducting link equalization (equalization) training, which is lack in the current UniPro 2.0 & M-PHY 5.0 standards.

The foregoing mainly describes the solutions provided in the embodiments of the application. It may be understood that, to implement the foregoing functions, a mobile device includes corresponding hardware structures and/or software modules for performing the functions. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In one embodiment of the application, the mobile device implementing the above functions may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used. An example in which each function module is obtained through division based on each corresponding function is used below for description.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A link equalization training method for a mobile device, comprising:
setting to start-up link;
performing a first power mode change to change a link rate to a first data rate;
performing link equalization training on a receiver of a second node in response to a plurality of training sequences from a first node;
when link equalization training in the receiver of the second node is not completed and there is no error event, making a decision mechanism for controlling continuation or reset of link equalization training in the receiver of the second node;
when link equalization training in the receiver of the second node is not completed and there is any error event, making the decision mechanism to reset for start-up link; and
when link equalization training in the receiver of the second node is completed, setting link-up in the first data rate for data transfer.

2. The method according to claim 1, further comprising:
performing a second power mode change for changing the link rate to a second data rate lower than the first data rate, the second power mode change is performed before the first power mode change.

3. The method according to claim 1, wherein
link equalization training includes a first phase, a second phase and a third phase;
in the first phase, the first node transmits a plurality of first training sequences to the second node by using a preset gear setting of a transmitter of the first node, the first training sequences including a plurality of 2-level Pulse-amplitude modulation (PAM)-N signals, the second node performing link equalization training based on the plurality of first training sequences;
in the second phase, the first node transmits a plurality of second training sequences to the second node by using the preset gear setting of the transmitter of the first node, the second training sequences including a plurality of all-level PAM-N signals, the second node performing link equalization training based on the plurality of second training sequences;

between the second phase and the third phase, the transmitter of the first node enters into a stall mode to change the preset gear setting of the transmitter of the first node;

in the third phase, a transmitter of the second node sends receiver request preset information in an information exchange frame to the first node, the receiver request preset information is used to inform the first node about an optimized gear setting selected by the receiver of the second node after link equalization training, the information exchange frame in the third phase including a plurality of 2-level PAM-N signals; and after the third phase, the transmitter of the first node changes the preset gear setting based on the optimized gear setting selected by the receiver of the second node.

4. The method according to claim 3, wherein in link equalization training, in the first phase, the transmitter of the first node sends the plurality of first training sequences including the plurality of 2-level Pulse-amplitude modulation (PAM)-N signals to the receiver of the second node to train link equalization of the receiver of the second node;

in the second phase, the transmitter of the first node sends the plurality of second training sequences including the plurality of all-level PAM-N signals to the receiver of the second node to train link equalization of the receiver of the second node;

in a first round of link equalization training, a default preset gear setting is used, in a second or later rounds of link equalization training, the preset gear setting is changed by the receiver of the second node;

the transmitter of the first node changes a preset Feed-Forward Equalizer (FFE) gear setting of the transmitter of the first node in the stall mode;

in the third phase, the first node and the second node exchange information about optimized gear setting selected by the receiver of the second node after link equalization training, wherein in the third phase, the default preset gear setting is set in the second phase, and in the third phase, in the first or later rounds of link equalization training, the default preset gear setting is used, and the preset gear setting in the first phase and the second phase of the next round is set in the third phase;

when link equalization training for all active lanes are not done, the transmitter of the first node changes the preset gear setting based on the optimized gear setting selected by the receiver of the second node in the stall mode.

5. The method according to claim 4, wherein in link equalization training, in the first phase, the receiver of the second node receives the first training sequences from the transmitter of the first node to train link equalization of the receiver of the second node;

in the second phase, the receiver of the second node receives the second training sequences from the transmitter of the first node to train link equalization of the receiver of the second node;

the receiver of the second node changes equalization setting in the stall mode;

in the third phase, the first node and the second node exchange information about the optimized gear setting selected by the receiver of the second node after link equalization training;

when link equalization training for all active lanes are not done, the receiver of the second node changes equalization setting in the stall mode.

6. The method according to claim 5, wherein an information exchange frame includes a first indicator for detecting equalization information frame, a second indicator for indicating receiver link equalization training interruption request if any error event occurs, and a third indicator for indicating whether receiver link equalization training is done or not.

7. The method according to claim 6, wherein before both the transmitter of the first node and the receiver of the second node enter burst state in the third phase, in a first part of the third phase, whether both the transmitter of the first node and the receiver of the second node enter into burst state is determined;

when both the transmitter of the first node and the receiver of the second node enter into burst state, the method returns to the step of performing the first power mode change;

when not both the transmitter of the first node and the receiver of the second node enter into burst state, the transmitter of the first node sends the information exchange frame to the receiver of the second node, and the receiver of the second node ignores any cyclic redundancy check (CRC) errors.

8. The method according to claim 7, wherein after both the transmitter of the first node and the receiver of the second node enter burst state in the third phase, in a second part of the third phase, the transmitter of the first node sends the information exchange frame to the receiver of the second node;

the receiver of the first node determines that whether an error counter is higher than an error counter threshold or not, wherein when an error is found by the receiver of the second node, the error counter is updated, and when the error counter reaches the error counter threshold, an error event occurs and the error counter is freeze;

when the error counter is higher than the error counter threshold, the transmitter of the first node sends the information exchange frame to the receiver of the second node to indicate that the transmitter of the first node acknowledges a receiver link equalization training interruption request;

when the transmitter of the first node sends the information exchange frame to the receiver of the second node in k, k being a natural number, times or more than k times, the transmitter of the first node exits the third phase;

when the error counter is not higher than the error counter threshold and the receiver of the second node receives the information exchange frame m times, m being a natural number, the transmitter of the first node sends the information exchange frame to the receiver of the second node to indicate detection of equalization training;

when the transmitter of the first node sends the information exchange frame k times, the receiver of the first node determines that whether the error counter is higher than the error counter threshold or not; when the error counter is higher than the error counter threshold, the transmitter of the first node sends the information exchange frame to the receiver of the second node to indicate that the transmitter of the first node acknowledges receiver link equalization interruption request, and when the transmitter of the first node sends the information exchange frame to the receiver of the second node in k times or more than k times, the transmitter of the first node exits the third phase; when the error counter is not higher than the error counter threshold and when the receiver of the first node receives the information exchange frame in m times, the transmitter of the first node exits the third phase.

9. The method according to claim 8, wherein in a normal case after both the transmitter of the first node and the receiver of the second node enter into burst state in the third phase, the transmitter of the first node and the transmitter of the second node send the information exchange frame to each other until the receivers of the first and the second nodes trigger;

the receivers of the first and the second nodes receive once the information exchange frame without any CRC error;

the first indicator of the information exchange frame is changed from a first value to a second value and the receivers of the first and the second nodes trigger the transmitters of the first and the second nodes to send the information exchange frame to the receivers of the respective other nodes;

the transmitters of the first and the second nodes send the information exchange frame to each other at least k times;

when the receivers of the first and the second nodes receive the information exchange frame one time, and do not experience at least k consecutive CRC errors, the link equalization training is not interrupted and the transmitters of the first and the second nodes exit the third phase;

after the transmitters of the first and the second nodes send the information exchange frame at least k times, the link equalization training is interrupted, and the transmitters of the first and the second nodes exit the third phase; and after a link equalization training timer is timeout, the link equalization training is interrupted, and the transmitters of the first and the second nodes exit the third phase.

10. The method according to claim 9, wherein when the receiver of the first node receives once the information exchange frame, the receiver of the first node determines that the receiver of the second node experiences at least k consecutive CRC errors, the link equalization training is interrupted; and when the receiver of the first node experiences at least k consecutive CRC errors, the transmitter of the first node sends the information exchange frame to the second node and the link equalization training is interrupted.

11. The method according to claim 10, wherein when the receiver of the first node receives end of burst (EOB), the receiver of the first node exits the third phase.

12. The method according to claim 11, wherein when all active lanes on the same node have link equalization training done, the transmitter of the first node sends the information exchange frame for indicating link equalization training completed; and when the transmitter of the first node only sends the information exchange frame and the receiver of the first node only receives the information exchange frame, link equalization training on all active lanes on both nodes is done.

13. The method according to claim 12, wherein the decision mechanism includes:

a decision flow for timeout;

a decision flow for link equalization training interruption;

a decision flow for optimal transmitter equalization update; and a decision flow for link equalization training.

14. The method according to claim 13, wherein in the decision flow for timeout, reading information from the information exchange frame and writing into a plurality of registers respectively for all active lanes;

when a link equalization training timer is not timeout, proceeding to the decision flow for link equalization training interruption;

when the link equalization training timer is timeout, determining whether timeout of the link equalization training timer is first time;

when timeout of the link equalization training timer is first time, an initial transmitter equalization gear is changed, the transmitter equalization gear in the first phase and the second phase is unchanged, the link equalization training is retried, and device management entity (DME) is reset;

when timeout of the link equalization training timer is not first time, in response to a timeout retry counter is equal to or higher than a maximum timeout retry counter, the decision mechanism decides that the link rate is downgraded; the link rate does not ever go to the first data rate or above again; and DME is reset; and when timeout of the link equalization training timer is not first time, in response to the timeout retry counter is lower than the maximum timeout retry counter, the decision mechanism determines that the initial transmitter equalization gear is unchanged, the transmitter equalization gear in the first phase, the second phase and the third phase is not changed; and the link equalization training is retried.

15. The method according to claim 14, wherein in the decision flow for link equalization training interruption, a link equalization training timeout retry counter is reset;

when link equalization training interruption occurs, the flow proceeds to the decision flow for optimal transmitter equalization update;

when link equalization training interruption does not occur and when a retry upper limit is not reached, the transmitter equalization gear is not changed in the first phase to the third phase, the first phase to the third phase are retried; and when link equalization training interruption does not occur and when the retry upper limit is reached, the link rate is downgraded, the link rate does not ever go to the first data rate or above again, and DME is reset.

16. The method according to claim 15, wherein in the decision flow for optimal transmitter equalization update, a software interrupt retry counter is reset, and information about an optimal transmitter equalization gear is read;

when a current performance is better than a previous performance, recording a current transmitter equalization gear, and setting a local optimal receiver equalization gear; and when the current performance is not better than the previous performance, setting the local optimal receiver equalization gear.

17. The method according to claim 16, wherein in the decision flow for link equalization training, when a bit error rate of transmitter equalization gear for all local lanes is lower than a bit error rate threshold, determining a link equalization training mode among a first mode and a second mode, in the first mode, once a first transmitter equalization gear for a lane is found, the lane reports link equalization training done and does not change the required transmitter equalization gear until all of the active lanes report link equalization training done, in the second mode, all available transmitter equalization gears are tried to find an optimal one for transmission;

when the first mode is selected, a local device reports link equalization training done and in the third phase of the next round, the local device sends the information exchange frame;

in case the second mode is selected, when not all transmitter equalization gears are trained, the local device requests a peer device to set a new transmitter equalization gear, and in the third phase of the next round, the local device sends the information exchange frame, and the flow returns to link equalization train, and when all transmitter equalization gears are trained, the local device reports link equalization training done and in the third phase of the next round, the local device sends the information exchange frame;

in case that not the bit error rate of transmitter equalization gear for all local lanes is lower than the bit error rate threshold, when all transmitter equalization gears are trained, resetting DME and the flow returns to start-up link setting, and when not all transmitter equalization gears are trained, the local device requests the peer device to set the new transmitter equalization gear, and in the third phase of the next round, the local device sends the information exchange frame, and the flow returns to link equalization train.

* * * * *